(12) United States Patent
Hashimoto et al.

(10) Patent No.: US 10,005,357 B2
(45) Date of Patent: Jun. 26, 2018

(54) WORKING VEHICLE

(71) Applicant: Yanmar Co. Ltd., Osaka-shi, Osaka (JP)

(72) Inventors: Yusuke Hashimoto, Osaka (JP); Kazumi Yokota, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days. days.

(21) Appl. No.: 15/448,713

(22) Filed: Mar. 3, 2017

(65) Prior Publication Data

US 2017/0174075 A1    Jun. 22, 2017

Related U.S. Application Data

(63) Continuation of application No. PCT/JP2015/073327, filed on Aug. 20, 2015.

(30) Foreign Application Priority Data

Sep. 9, 2014  (JP) .................. 2014-183343

(51) Int. Cl.
*F16H 57/025* (2012.01)
*B60K 17/10* (2006.01)
(Continued)

(52) U.S. Cl.
CPC .............. *B60K 17/10* (2013.01); *A01B 71/02* (2013.01); *B60K 17/08* (2013.01); *B60K 17/165* (2013.01);
(Continued)

(58) Field of Classification Search
CPC ...... B60K 17/28; B60K 17/165; B60K 17/10; F16H 57/025
See application file for complete search history.

(56) References Cited

U.S. PATENT DOCUMENTS 4,691,802 A * 9/1987 Ishimori .............. B60K 17/105
                                                180/291
7,300,241 B2 * 11/2007 Fukudome .............. E02F 3/627
                                                172/274
(Continued)

FOREIGN PATENT DOCUMENTS

EP   2392485 A1   12/2011
JP   59-187170 A  10/1984
(Continued)

OTHER PUBLICATIONS

Kitagawa et al., Body Structure of Tractor, Feb. 2, 2006, JPO, JP 2006-025737 A, Machine Translation of Description (Year: 2006).*
(Continued)

*Primary Examiner* — James A English
(74) *Attorney, Agent, or Firm* — Norris McLaughlin & Marcus, P.A.

(57) ABSTRACT

A working vehicle includes: an engine mounted on a traveling machine body; a hydraulic continuously variable transmission configured to shift driving force from the engine; a transmission case incorporating the hydraulic continuously variable transmission; and rear traveling units disposed on both left and right sides of the transmission case via rear axle cases. The transmission case is divided into three sections of a front case, an intermediate case, and a rear case. The left and right rear axle cases are attached to both left and right sides of the rear case. The intermediate case, coupling the front case to the rear case, is coupled to left and right vehicle body frames forming the traveling machine body.

11 Claims, 21 Drawing Sheets

(51) Int. Cl.
*A01B 71/02* (2006.01)
*B60K 25/06* (2006.01)
*B60K 17/08* (2006.01)
*B60K 17/16* (2006.01)
*B60K 17/28* (2006.01)
*B62D 49/06* (2006.01)

(52) U.S. Cl.
CPC .............. *B60K 17/28* (2013.01); *B60K 25/06* (2013.01); *B62D 49/06* (2013.01); *F16H 57/025* (2013.01); *B60K 2025/065* (2013.01)

(56) References Cited

U.S. PATENT DOCUMENTS

| | | | |
|---|---|---|---|
| 7,735,594 B2* | 6/2010 | Hidaka | B62D 49/06 180/311 |
| 2005/0150316 A1* | 7/2005 | Ishii | B60K 17/105 74/11 |
| 2005/0172740 A1* | 8/2005 | Ebihara | B60K 17/28 74/15.4 |
| 2007/0193407 A1 | 8/2007 | Yamaguchi et al. | |
| 2010/0261569 A1* | 10/2010 | Ishikawa | B60K 17/165 475/230 |
| 2011/0284306 A1 | 11/2011 | Ibe et al. | |
| 2014/0290399 A1* | 10/2014 | Fukunaga | B60K 17/28 74/15.86 |
| 2016/0238118 A1* | 8/2016 | Kato | A01D 69/03 |
| 2017/0217309 A1* | 8/2017 | Hashimoto | B60K 5/02 |
| 2017/0219076 A1* | 8/2017 | Hashimoto | F16H 35/10 |

FOREIGN PATENT DOCUMENTS

| | | | |
|---|---|---|---|
| JP | S63303263 | A | 12/1988 |
| JP | 8-156755 | A | 6/1996 |
| JP | 10-203185 | A | 8/1998 |
| JP | 3575937 | B2 | 10/2004 |
| JP | 2005-282612 | A | 10/2005 |
| JP | 2006-025737 | A | 2/2006 |
| JP | 2007-190968 | A | 8/2007 |
| JP | 2008-105537 | A | 5/2008 |
| JP | 2008105537 | A * | 5/2008 |
| JP | 2010-052734 | A | 3/2010 |
| WO | 2016/0600061 | A1 | 4/2016 |

OTHER PUBLICATIONS

Ishida et al., Transmission Case for Tractor, Feb. 2, 2006, JPO, JP 10-203185 A, Machine Translation of Description (Year: 1998).*

Osamu Hyodo, Brake for Tractor, Jun. 18, 1996, JPO, JP 08-156755 A, Machine Translation of Description (Year: 1996).*

* cited by examiner

WORKING VEHICLE

CROSS-REFERENCE TO RELATED APPLICATIONS

The present application is a continuation application of International Application No. PCT/JP2015/073327, filed Aug. 20, 2015, which claims priority to Japanese Patent Application No. 2014-183343, filed Sep. 9, 2014. The contents of these applications are incorporated herein by reference in their entirety.

BACKGROUND OF THE INVENTION

The present invention relates to a working vehicle.

In conventional working vehicles, such as a tractor and a wheel loader, an engine is mounted on a front portion of a vehicle body frame, a transmission case is coupled to a rear portion of the vehicle body frame, and a traveling machine body is supported by front and rear traveling units. For example, the transmission case incorporates a traveling transmission gear mechanism, a differential gear mechanism, a PTO transmission gear mechanism, and the like. Driving force from the engine on the front side is transmitted to the transmission case on the rear side, and is transmitted to at least the left and right rear traveling units from the differential gear mechanism in the transmission case. The driving force is further transmitted to a working unit, such as a rotary tiller, from the PTO transmission gear mechanism in the transmission case (see, for example Japanese Unexamined Patent Application Publication No. 2010-52734).

In a working vehicle in Japanese Unexamined Patent Application Publication No. 2010-52734, an inline hydraulic continuously variable transmission is assembled in a transmission case. The hydraulic continuously variable transmission includes: a hydraulic pump unit that receives driving force from an engine via an input shaft; and a hydraulic motor unit that transmits a shifted output to rear traveling units and the like via an output shaft. The input shaft and the output shaft are coaxially positioned to form a double shaft. A cylinder block is fit on and integrally rotates with the input shaft. The hydraulic pump unit and the hydraulic motor unit are fit on the input shaft at portions respectively on one side and the other side of the cylinder block. In the working vehicle in Japanese Unexamined Patent Application Publication No. 2010-52734, the hydraulic continuously variable transmission is accommodated in the transmission case and is disposed on a rear side to be adjacent to a differential gear mechanism.

SUMMARY OF THE INVENTION

To achieve higher assemblability and maintainability and smaller number of parts, in the transmission case, systems, such as a traveling power transmission system including the hydraulic continuously variable transmission and the traveling transmission gear mechanism and a PTO transmission system including the PTO transmission gear mechanism and the PTO shaft, are separately arranged with the components in each system closely arranged. In the configuration in Japanese Unexamined Patent Application Publication No. 2010-52734, the traveling transmission gear mechanism, the PTO transmission gear mechanism, and the like are disposed in the front portion in the transmission case, and the differential gear mechanism, the hydraulic continuously variable transmission, the PTO shaft, and the like are disposed on the rear side of the transmission case. Thus, the components of each transmission system are not closely arranged, and thus there has been a room for improvement in terms of assemblability, maintainability, and the number of parts.

The transmission case is used as a hydraulic oil tank. Hydraulic oil in the transmission case is supplied as lubricant oil to internal mechanisms in the transmission case, and thus is supplied to hydraulically driven devices including the internal mechanisms. Thus, there has been a demand for supplying lubricant oil to the internal mechanism as stably as possible.

The working vehicle of this type includes left and right brake mechanisms for left and right rear wheels as the rear traveling units. The brake mechanisms put a brake on the left and right rear wheels in accordance with a braking operation on a brake pedal or a parking brake lever. In the conventional configuration, the braking operation with the brake pedal and the braking operation on the parking brake lever both lead to the braking operation by the common left and right brake mechanism (the braking for the traveling and the braking for the parking are executed by the left and right brake mechanisms only). Thus, there has been a room for improvement in terms of maintaining durability of the brake mechanism.

The working vehicle rotates the PTO shaft by the driving force directly transmitted from the engine, and thus in many cases, the rotation speed of the PTO shaft is at a constant speed regardless of the vehicle speed. For example, there has been a strong demand for synchronizing the rotation speed of the PTO shaft with the vehicle speed, in a fertilizing operation and a seeding operation.

A technical object of the invention according to the present application is to provide an improved working vehicle in view of the current situation described above.

The invention in the present application provides a working vehicle including: an engine mounted on a traveling machine body, a hydraulic continuously variable transmission configured to shift driving force from the engine, a transmission case incorporating the hydraulic continuously variable transmission, and rear traveling units disposed on both left and right sides of the transmission case via rear axle cases, in which the transmission case is divided into three sections of a front case, an intermediate case, and a rear case, the rear axle cases on the left and right sides are attached to both left and right sides of the rear case, and the intermediate case, coupling the front case to the rear case, is coupled to left and right vehicle body frames forming the traveling machine body.

In the working vehicle, the intermediate case and the rear case may be made of cast iron and the front case may be made of die-cast aluminum.

In the working vehicle, an input shaft that receives driving force from the engine and an input transmission shaft that receives driving force from the input shaft may extend from the front case to the intermediate case, while being in parallel with each other, and the hydraulic continuously variable transmission may be disposed in the front case via the input transmission shaft.

In the working vehicle, a forward/backward traveling switching mechanism configured to switch an output from the hydraulic continuously variable transmission between normal and reverse rotation directions may be disposed in the intermediate case.

In the working vehicle, the hydraulic continuously variable transmission may be attached on an inner surface side of a front lid member that is detachably attached to close an opening on a front surface of the front case.

In the working vehicle, a traveling transmission gear mechanism configured to achieve multistage transmission of an output from the forward/backward traveling switching mechanism may be further disposed in the front case, and the hydraulic continuously variable transmission may be disposed at a higher position than the traveling transmission gear mechanism in the front case.

In the working vehicle, a lubricant oil pump driven by the driving force from the engine may be disposed in the transmission case, and hydraulic oil in the transmission case may be supplied by the lubricant oil pump to an internal mechanism in the transmission case for lubrication.

In the working vehicle, a front chamber, an intermediate chamber, and a rear chamber may be formed in the transmission case, the hydraulic continuously variable transmission is disposed in the front chamber, the forward/backward traveling switching mechanism is disposed in the intermediate chamber, the PTO hydraulic clutch is disposed in the rear chamber, the lubricant oil pump may be supported by an intermediate supporting plate attached to a front surface side of a rear partitioning wall partitioning between the intermediate chamber and the rear chamber.

In the working vehicle, a differential mechanism configured to transmit shifted driving force from the transmission case to the left and right rear traveling units may be disposed in the transmission case, and a parking brake configured to maintain a braking state of the differential mechanism may be disposed in the transmission case, separately from left and right brake mechanisms configured to put a brake on the rear traveling units In the working vehicle, a front chamber, an intermediate chamber, and a rear chamber may be formed in the transmission case, the parking brake may be positioned on the intermediate chamber side, the differential mechanism may be positioned on the rear chamber side, an intermediate supporting plate may be detachably fastened to a front surface side of a rear partitioning wall partitioning between the intermediate chamber and the rear chamber, and the parking brake may be supported by the intermediate supporting plate.

In the working vehicle, a vehicle speed synchronized output may be transmitted from a driving force transmission system for the parking brake to a PTO shaft extending rearward from the transmission case.

In the embodiment of the present invention, the working vehicle includes: the engine mounted on the traveling machine body; the hydraulic continuously variable transmission configured to shift driving force from the engine; the transmission case incorporating the hydraulic continuously variable transmission; and the rear traveling units disposed on both left and right sides of the transmission case via the rear axle cases. The transmission case is divided into three sections of the front case, the intermediate case, and the rear case. Thus, the three sections, that is, the front case, the intermediate case, and the rear case can be assembled with parts such as a shaft and gears provided in the cases in advance. Thus, the transmission case can be accurately and efficiently assembled.

The left and the right rear axle cases are attached to both left and right sides of the rear case. The intermediate case coupling the front case and the rear case to each other are coupled to the left and right vehicle body frames forming the traveling machine body. Thus, for example, only the front case can be detached, for performing operations such as replacement of the shaft and the gear, with the intermediate case and the rear case remaining attached to the vehicle body frames. Thus, the transmission case as a whole is much less frequently removed (detached) from the working vehicle, whereby the maintenance and repairing can be performed with much higher operability.

In the embodiment of the present invention, the intermediate case and the rear case are made of cast iron, and the front case is made of die-cast aluminum. Thus, the intermediate case coupled to the vehicle body frames and the rear case to which the left and right rear axle cases are coupled can be formed as highly rigid members forming the traveling machine body. The front case is not a rigid member but can have a light weight. All things considered, the transmission case as a whole can be made to have a light weight, with the traveling machine body being sufficiently rigid.

In the embodiment of the present invention, the input shaft, receiving the driving force from the engine, and the input transmission shaft, receiving the driving force from the input shaft, are arranged in parallel with each other and extend from the front case to the intermediate case. The hydraulic continuously variable transmission is disposed in the front case via the input transmission shaft. Thus, for example, the hydraulic continuously variable transmission can be exposed by detaching only the front case with the intermediate case and the rear case remaining attached to the vehicle body frames. Thus, a higher maintainability can be achieved for the hydraulic continuously variable transmission disposed in the transmission case.

In the embodiment of the present invention, the working vehicle includes: the engine mounted on the traveling machine body; the hydraulic continuously variable transmission configured to shift driving force from the engine; the transmission case incorporating the hydraulic continuously variable transmission; and the rear traveling units disposed on both left and right sides of the transmission case via rear axle cases. The transmission case is divided into three sections of the front case, the intermediate case, and the rear case. Thus, the three sections, that is, the front case, the intermediate case, and the rear case can be assembled with parts such as a shaft and gears provided in the cases in advance. Thus, the transmission case can be accurately and efficiently assembled.

The input shaft receiving the driving force from the engine and the input transmission shaft receiving the driving force from the input shaft extend from the front case to the intermediate case while being arranged in parallel with each other. In the front case, the hydraulic continuously variable transmission is disposed via the input transmission shaft. In the intermediate case, the forward/backward traveling switching mechanism is disposed that switches the output from the hydraulic continuously variable transmission between the normal and reverse rotation directions. Thus, the traveling power transmission system can be collectively accommodated in the front case and the intermediate case (front portion of the transmission case), whereby a higher assemblability and maintainability can be achieved for the traveling power transmission system and the transmission case.

In the embodiment of the present invention, the intermediate case and the rear case are made of cast iron, and the front case is made of die-cast aluminum. The traveling transmission gear mechanisms for multistage shifting of the output from the forward/backward traveling switching mechanism, are further provided in the front case. Thus, the forward/backward traveling switching mechanism is provided on a side of the intermediate case which is heavy, whereas the hydraulic continuously variable transmission and the traveling transmission gear mechanisms are provided on the side of the front case, which is light. Thus, the transmission case can have an excellent weight balance.

In the embodiment of the present invention, the working vehicle includes: the engine mounted on the traveling machine body; the hydraulic continuously variable transmission configured to shift driving force from the engine; the transmission case incorporating the hydraulic continuously variable transmission; and the rear traveling units disposed on both left and right sides of the transmission case via rear axle cases. The transmission case is divided into three sections of the front case, the intermediate case, and the rear case. The input shaft, receiving the driving force from the engine, and the input transmission shaft, receiving the driving force from the input shaft, are arranged in parallel with each other and extend from the front case to the intermediate case. In the front case, the hydraulic continuously variable transmission is disposed via the input transmission shaft. The hydraulic continuously variable transmission is attached on the inner surface side of the front lid member that is detachably attached to close the opening of the front surface of the front case. Thus, the hydraulic continuously variable transmission can be exposed when the front lid member is detached from the transmission case. Thus, a higher maintainability can be achieved for the hydraulic continuously variable transmission disposed in the transmission case.

In the embodiment of the present invention, the traveling transmission gear mechanisms for multistage shifting of the output from the forward/backward traveling switching mechanism, are further provided in the front case. The hydraulic continuously variable transmission is disposed in the front case to be positioned higher than the traveling transmission gear mechanisms. Thus, the traveling transmission gear mechanisms with smaller resistance to stirring of the hydraulic oil in the transmission case compared with the hydraulic continuously variable transmission, are at a low position. Thus, a risk of stirring the hydraulic oil in the transmission case in the hydraulic continuously variable transmission can be reduced (the resistance to stirring the hydraulic oil due to the hydraulic continuously variable transmission can be reduced). This contributes to an improvement of the transmission efficiency of the hydraulic continuously variable transmission.

In the embodiment of the present invention, the working vehicle includes: the engine mounted on the traveling machine body; and the transmission case configured to shift the driving force from the engine and transmit the resultant force to the traveling units configured to support the traveling machine body. The lubricant oil pump driven by the driving force from the engine is disposed in the transmission case. The lubricant oil pump supplies the hydraulic oil in the transmission case to the internal mechanisms of the transmission case for lubrication. Thus, the hydraulic oil can be supplied as the lubricant oil to the internal mechanisms of the transmission case by the dedicated lubricant oil pump, whereby the internal mechanisms can be certainly lubricated. Thus, the lubricant oil can be stably supplied to the internal mechanisms, and the proper function of the internal mechanisms can be guaranteed.

In the embodiment of the present invention, the front chamber, the intermediate chamber, and the rear chamber are formed in the transmission case. The hydraulic continuously variable transmission is disposed in the front chamber. The forward/backward traveling switching mechanism is disposed in the intermediate chamber. The PTO hydraulic clutch is disposed in the rear chamber. The lubricant oil pump is supported by the intermediate supporting plate attached to the front surface of the rear partitioning wall partitioning between the intermediate chamber and the rear chamber. Thus, the lubricant oil pump can be disposed at the closest possible position relative to the members as members in the internal mechanisms consuming a large amount of lubricant oil. Thus, the lubricant oil can be actively supplied to the members, and the lubrication hydraulic system can be simplified.

In the embodiment of the present invention, the working vehicle includes: the engine mounted on the traveling machine body; the transmission case configured to shift the driving force from the engine; and the rear traveling units provided on both left and right sides of the transmission case via the rear axle cases. The transmission case incorporates the differential mechanism that transmits the shifted driving force from the transmission case to the left and right rear traveling units. The parking brake is disposed in the transmission case, separately from the left and right brake mechanisms for putting a brake on the rear traveling units. The parking brake maintains the braking state of the differential mechanism. Thus, the braking for the traveling and the braking for the parking can be separately executed by different brakes (the brake mechanism and the parking brake). Thus, durability of both the brake mechanism and the parking brake can be improved.

In the embodiment of the present invention, the front chamber, the intermediate chamber, and the rear chamber are formed in the transmission case. The parking brake is disposed on the side of the intermediate chamber. The differential mechanism is positioned on the side of the rear chamber. The intermediate supporting plate is detachably fastened to the front surface side of the rear partitioning wall partitioning between the intermediate chamber and the rear chamber. The intermediate supporting plate supports the parking brake. Thus, the parking brake can apply braking to the differential mechanism on the upstream side of the brake mechanism, whereby the braking state of the traveling machine body can be certainly maintained. The parking brake is entirely attached to the intermediate supporting plate. Thus, the intermediate supporting plate can be attached to the rear partitioning wall together with the parking brake. Thus, the assemblability of the transmission case can be improved, and the parking brake can be stably and accurately attached.

In the embodiment of the present invention, the working vehicle includes: the engine mounted on the traveling machine body; the transmission case configured to shift the driving force from the engine; and the rear traveling units provided on both left and right sides of the transmission case via the rear axle cases. The transmission case incorporates the differential mechanism that transmits the shifted driving force from the transmission case to the left and right rear traveling units. The parking brake is disposed in the transmission case, separately from the left and right brake mechanisms for putting a brake on the rear traveling units. The parking brake maintains the braking state of the differential mechanism. The vehicle speed synchronized output is transmitted, from the driving force transmission system for the parking brake, to the PTO shaft protruding rearward from the transmission case. Thus, the braking for the traveling and the braking for the parking can be separately executed by different brakes (the brake mechanism and the parking brake). Thus, durability of both the brake mechanism and the parking brake can be improved. Furthermore, the vehicle speed synchronized output can be transmitted to the PTO shaft with a simple structure by using the driving force transmission system for the parking brake. Thus, the number of parts and thus the cost can be reduced.

In the embodiment of the present invention, the front chamber, the intermediate chamber, and the rear chamber are formed in the transmission case. The differential mechanism is disposed in the rear chamber. The PTO transmission mechanism, which shifts the driving force from the engine and transmits the resultant force to the PTO shaft, is disposed in the rear chamber and further on the rear side than the differential mechanism. The parking brake is supported by the rear partitioning wall that partitions between the intermediate chamber and the rear chamber. Thus, compact arrangement of the parking brake and the PTO transmission mechanism on the forward and backward sides of the differential mechanism can be achieved. All things considered, the structure for transmitting the vehicle speed synchronized output to the PTO shaft can be further simplified, and an attempt to achieve the compact transmission case is facilitated.

DESCRIPTION OF THE EMBODIMENTS

Figure 1:
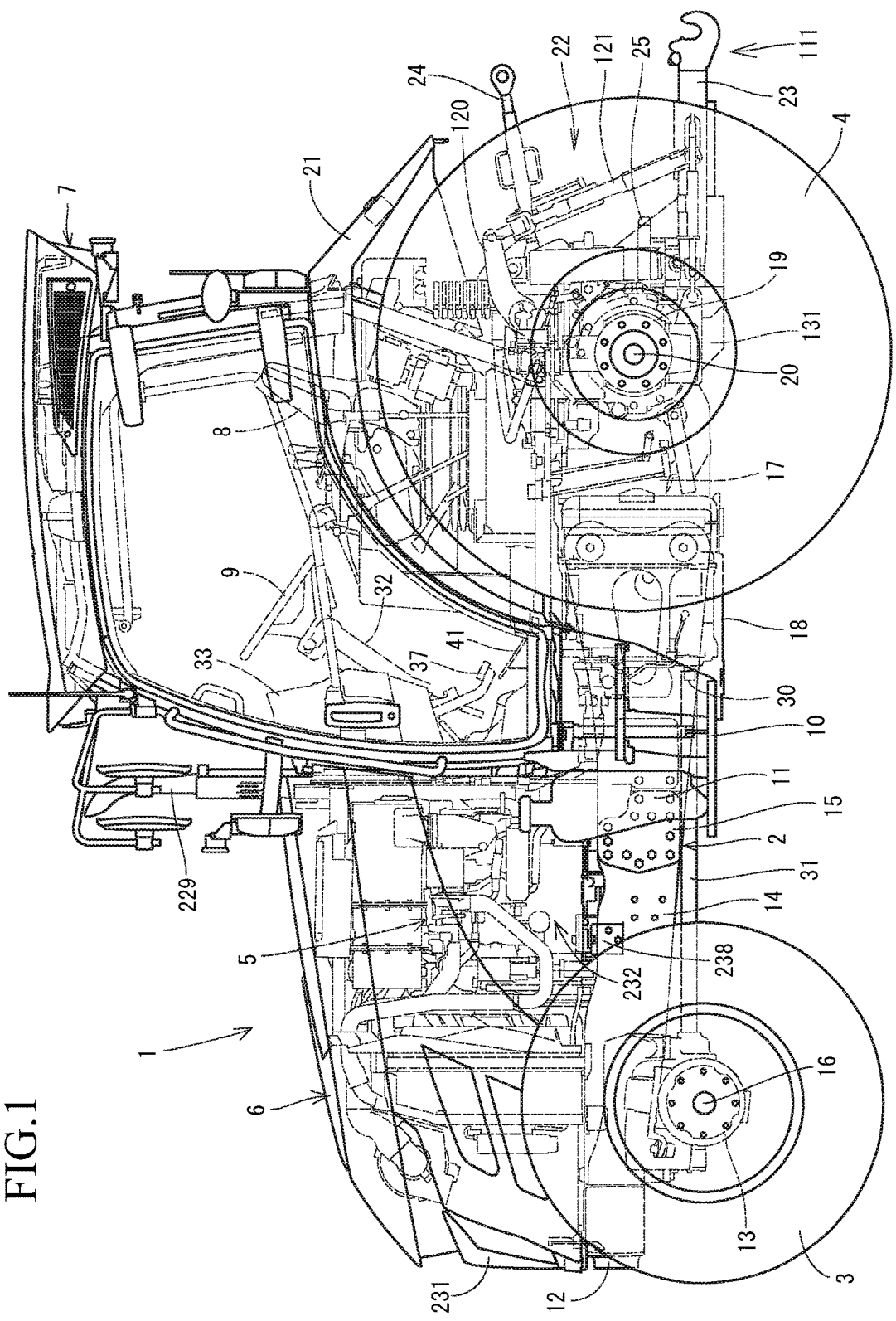
FIG. 1 is a left side view of a tractor.
Figure 2:
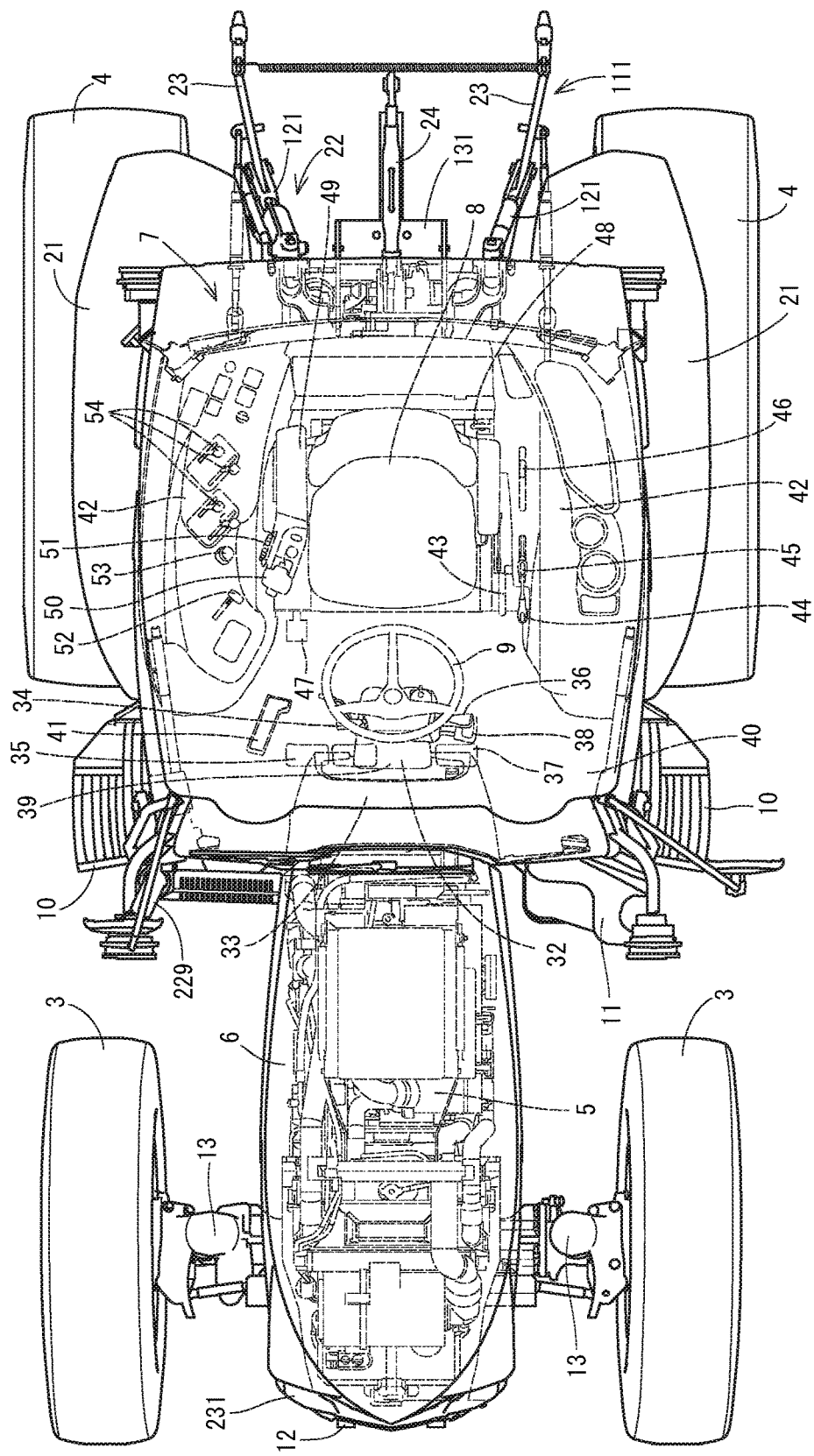
FIG. 2 is a plan view of the tractor.
Figure 3:
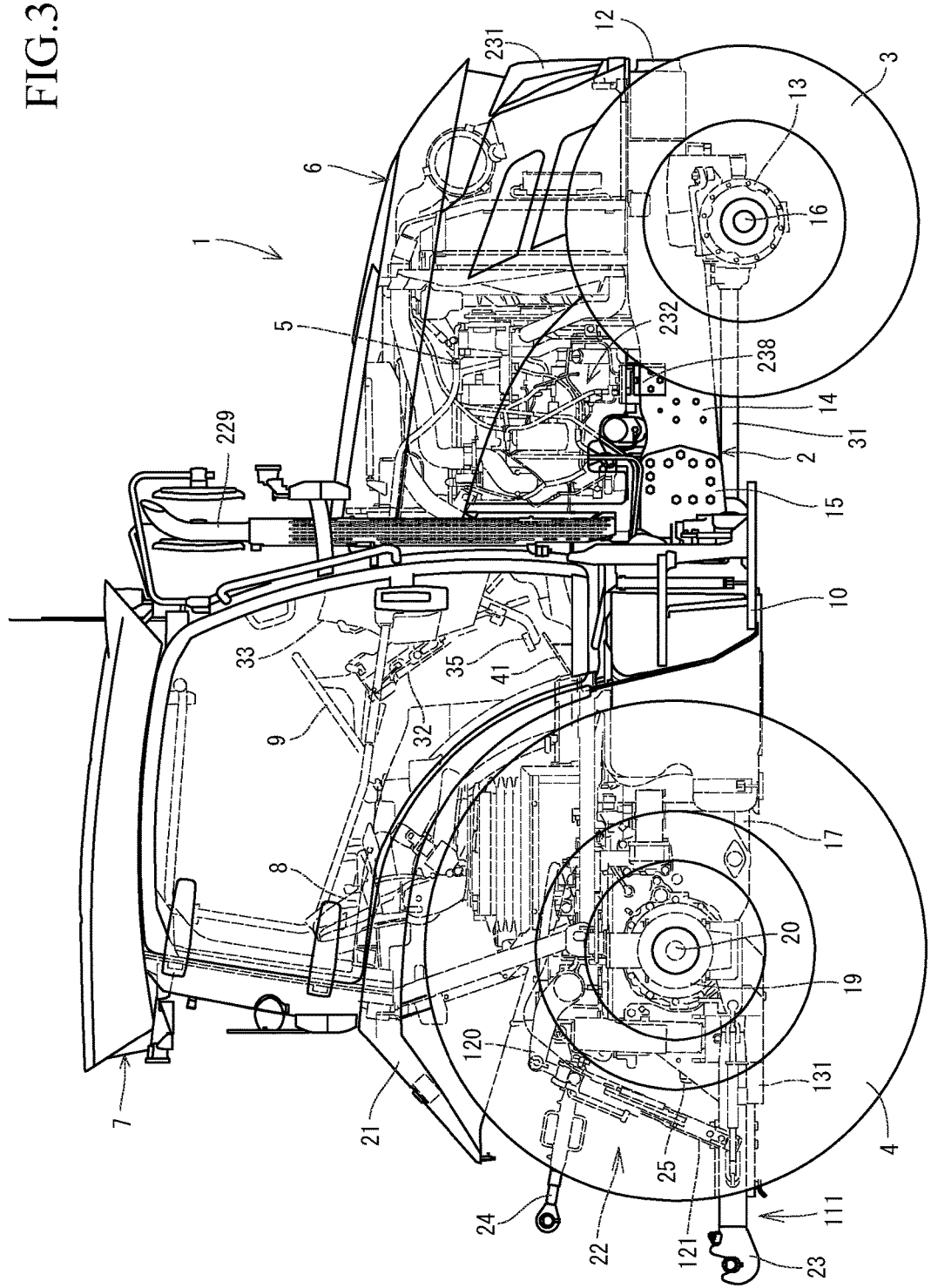
FIG. 3 is a right side view of the tractor.
Figure 4:
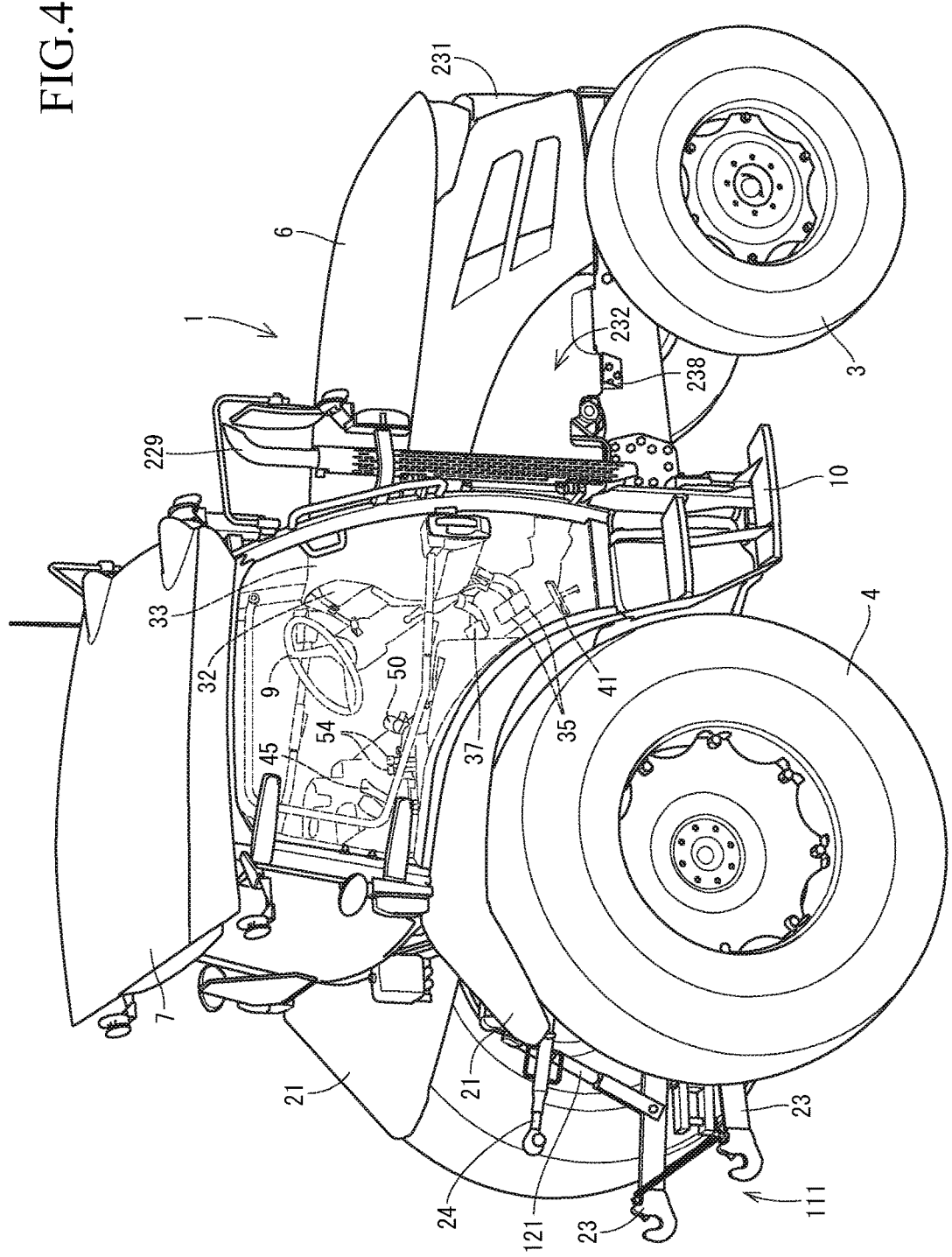
FIG. 4 is a perspective view of the tractor as diagonally viewed from a rear right side.
Figure 5:
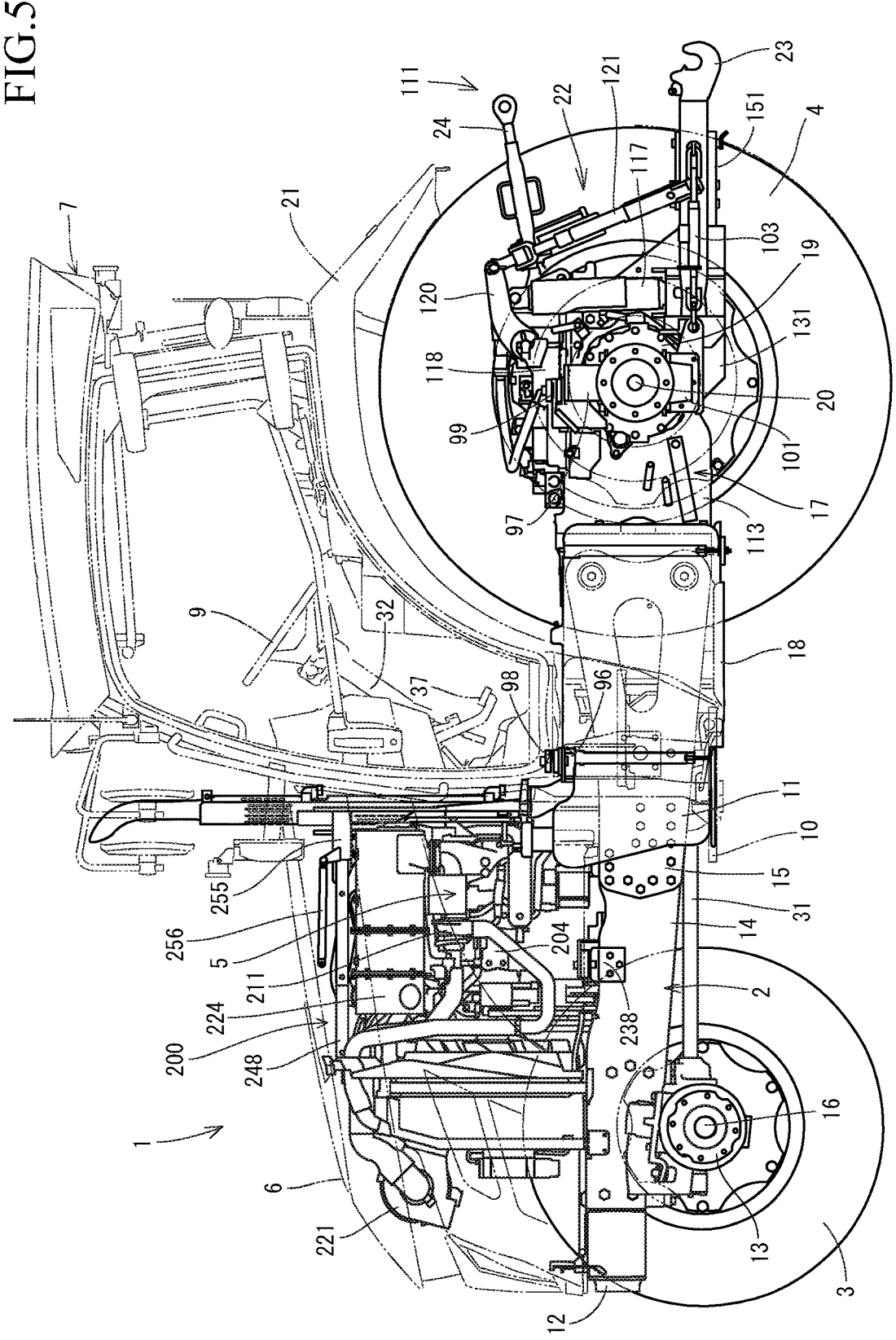
FIG. 5 is a left side view of a traveling machine body.

A farming tractor as an embodiment of the present invention is described below with reference to the drawings. As illustrated in FIG. 1 to FIG. 10, a traveling machine body 2 of a tractor 1 is supported by a pair of left and right front wheels 3 as a traveling unit and with a pair of left and right rear wheels 4 corresponding to a rear traveling unit. A diesel engine 5 (hereinafter, simply referred to as an engine) is mounted on a front portion of the traveling machine body 2 and drives the rear wheels 4 or the front wheels 3, so that the tractor 1 can travel forward and backward. The engine 5 is covered by a hood 6. The traveling machine body 2 has an upper surface provided with a cabin 7. The cabin 7 incorporates an operating seat 8 and a steering wheel 9 for performing a steering operation for the front wheels 3. Steps 10 with which an operator gets on and off the vehicle are provided to left and right outer sides of the cabin 7. A fuel tanks 11 for supplying fuel to the engine 5 is disposed on a lower side of a bottom portion of the cabin 7.

The traveling machine body 2 includes: an engine frame 14 including a front bumper 12 and a front axle casing 13; and left and right vehicle body frames 15 detachably fixed to a rear portion of the engine frame 14. A front axle 16 rotatably protrudes outward from both left and right ends of the front axle casing 13. The front wheels 3 are attached to the both left and right ends of the front axle casing 13 via the front axle 16. A transmission case 17 is coupled to the rear portions of the vehicle body frames 15. The transmission case 17 shifts the rotary driving force from the engine 5 as appropriate, and transmits the force to the four front and rear wheels 3, 3, 4, and 4. A tank frame 18 having a rectangular plate shape in bottom view and protruding outward toward the left and the right is fastened to a lower surface side of the transmission case 17 and the left and the right vehicle body frames 15 with bolts. In this embodiment, the fuel tanks 11 include two left and right tanks. The left and the right fuel tanks 11 are respectively mounted on the upper surface sides of the left and the right protruding portions of the tank frame 18. Left and right rear axle cases 19 are mounted to left and right outer side surfaces of the transmission case 17 while protruding outward. Left and right rear axles 20 are rotatably inserted in the left and the right rear axle cases 19. The rear wheels 4 are attached to the transmission case 17 via the rear axles 20. The left and the right rear wheels 4 have upper sides covered with left and right rear fenders 21.

A hydraulic lifting and lowering mechanism 22 that can lift and lower a ground working machine (not illustrated), such as a rotary tiller for example, is detachably attached to a rear portion of the transmission case 17. The ground working machine is coupled to the rear portion of the transmission case 17 via a three-point linkage mechanism 111 including a pair of left and right lower links 23 and a top link 24. A power-take off (PTO) shaft 25 protrudes rearward from a rear side surface of the transmission case 17 and is used for transmitting a PTO driving force to the working machine such as a rotary tiller.

A flywheel 26 is attached to be directly coupled to an output shaft (piston rod) of the engine 5 that protrudes rearward from a rear side surface of the engine 5. A main driving shaft 27 protruding rearward from the flywheel 26 and a main transmission input shaft 28 protruding forward from a front surface side of the transmission case 17 are coupled to each other via a driving force transmission shaft 29 including universal joints on both ends (see FIG. 1, FIG. 7, and FIG. 10). The transmission case 17 incorporates a hydraulic continuously variable transmission 500, a forward/backward traveling switching mechanism 501, a traveling transmission gear mechanism, and a rear wheel differential gear mechanism 506. The rotary driving force from the engine 5 is transmitted to the main transmission input shaft 28 of the transmission case 17 via the main driving shaft 27 and the driving force transmission shaft 29, and appropriate shifting is achieved with the hydraulic continuously variable transmission 500 and the traveling transmission gear mechanism, and the resultant shifted driving force is transmitted to the left and right rear wheels 4 via the rear wheel differential gear mechanism 506.

A front wheel output shaft 30 protruding forward from a lower portion of a front surface of the transmission case 17 is coupled to a front wheel transmission shaft 508 protruding rearward from the front axle casing 13 incorporating a front wheel differential gear mechanism 507, via a front wheel driving shaft 31. The shifted driving force, obtained by the hydraulic continuously variable transmission 500 and the traveling transmission gear mechanism in the transmission case 17, is transmitted to the left and the right front wheels 3 from the front wheel output shaft 30, the front wheel driving shaft 31 and the front wheel transmission shaft 508, via the front wheel differential gear mechanism 507 in the front axle casing 13.

Next, an internal structure of the cabin 7 is described with reference to FIG. 1 to FIG. 4. A steering column 32 is disposed on a front side of the operating seat 8 in the cabin 7. The steering column 32 stands while being buried on a rear surface side of a dashboard 33 disposed on a front surface side in the cabin 7. The steering wheel 9 having a substantially circular shape in plan view is attached to an upper end side of a steering shaft protruding upward from an upper surface of the steering column 32.

A one-touch lifting and lowering lever 34 and a pair of left and right brake pedals 35 are disposed on the right side of the steering column 32. The one-touch lifting and lowering lever 34 is used for forcibly moving the working machine such as a rotary tiller to the most lifted position and to the most lowered position. The pair of left and right brake pedals 35 are used for performing a braking operation for the traveling machine body 2. A forward and backward travel switching lever 36 (reverser lever) and a clutch pedal 37 are disposed on the left side of the steering column 32. The forward and backward travel switching lever 36 is used for switching the traveling direction of the traveling machine body 2 between forward and backward. The clutch pedal 37 is used for performing disengagement operation for a clutch (not illustrated) for power engagement/disengagement.

A misoperation preventing member 38 (reverser guard), which is disposed below and extend along the forward and backward travel switching lever 36, is disposed on the left side of the steering column 32. The misoperation preventing member 38 as a contact prevention member is disposed below the forward and backward travel switching lever 36 so that the operator getting on/off the tractor 1 can be prevented from accidentally being in contact with the forward and backward travel switching lever 36. An operation display board 39, incorporating a liquid crystal panel, is disposed on the upper portion side of a back surface of the dashboard 33.

An acceleration pedal 41 is disposed on the right side of the steering column 32 on a floor plate 40 in front of the operating seat 8 in the cabin 7. The acceleration pedal 41 is used for controlling a rotation speed of the engine 5, a vehicle speed, or the like. The floor plate 40 has an upper surface that is flat substantially over the entire area. Side columns 42 are disposed on both left and right sides of the operating seat 8. A parking brake lever 43, an ultra-low speed lever 44 (creep lever), a sub transmission lever 45, and a PTO transmission lever 46 are disposed between the operating seat 8 and the left side column 42. The parking brake lever 43 is used for executing an operation of maintaining a braking state of both left and right rear wheels 4. The ultra-low speed lever 44 (creep lever) is used for forcibly and largely reducing the traveling speed (vehicle speed) of the tractor 1. The sub transmission lever 45 is used for switching an output range of a traveling sub transmission gear mechanism in the transmission case 17. The PTO transmission lever 46 is used for performing switching operation for a driving speed of the PTO shaft 25. A diff-lock pedal 47, for activating and deactivating differential driving of both left and right rear wheels 4 is disposed on the lower side of the operating seat 8. A reverse PTO lever 48 for causing reverse driving of the PTO shaft 25 is disposed on the rear-left side of the operating seat 8.

An arm rest 49 where the arm or the elbow of the operator seated on the operating seat 8 rests is disposed between the operating seat 8 and the left side column 42. The arm rest 49 is provided separately from the operating seat 8, and includes a main transmission lever 50 and a work machine position dial 51 (lifting and lowering dial). The main transmission lever 50 is used for increasing and reducing the traveling speed of the tractor 1. The work machine position dial 51 is a dial with which the height position of the ground working machine, such as a rotary tiller, is manually changed and adjusted. The arm rest 49 is configured to be pivotal about its rear end lower portion to be raised by a plurality of stages.

A throttle lever 52, a PTO clutch switch 53, and a plurality of hydraulic operation levers 54 (SCV levers) are disposed in order from the front side on the left side column 42. The throttle lever 52 is used for setting and maintaining the rotation speed of the engine 5. The PTO clutch switch 53 is for performing an engagement/disengagement operation for driving force transmission from the PTO shaft 25 to the working machine such as a rotary tiller. The plurality of hydraulic operation levers 54 (SCV levers) are used for performing a switching operation for a hydraulic pressure output valve (sub control valve not illustrated) disposed on the upper surface side of the transmission case 17. The hydraulic output valve is used for controlling supplying of hydraulic oil to a hydraulic device of another working machine, such as a front loader retrofit to the tractor 1. In the embodiment, the number of the hydraulic operation levers 54 is four so as to be the same as the number of (four) the hydraulic pressure output valves.

Figure 7:
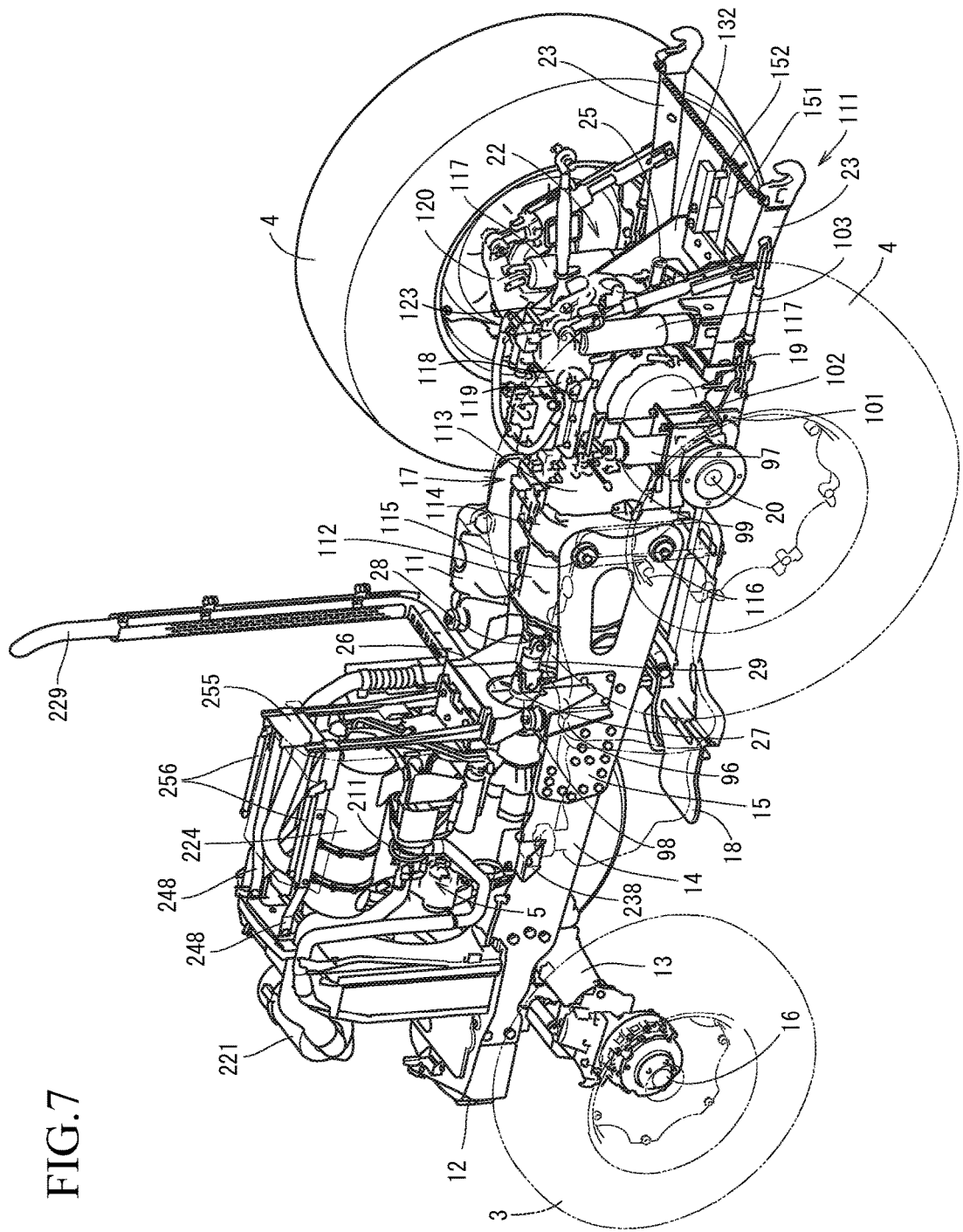
FIG. 7 is a perspective view of the traveling machine body as diagonally viewed from a rear left side.
Figure 8:
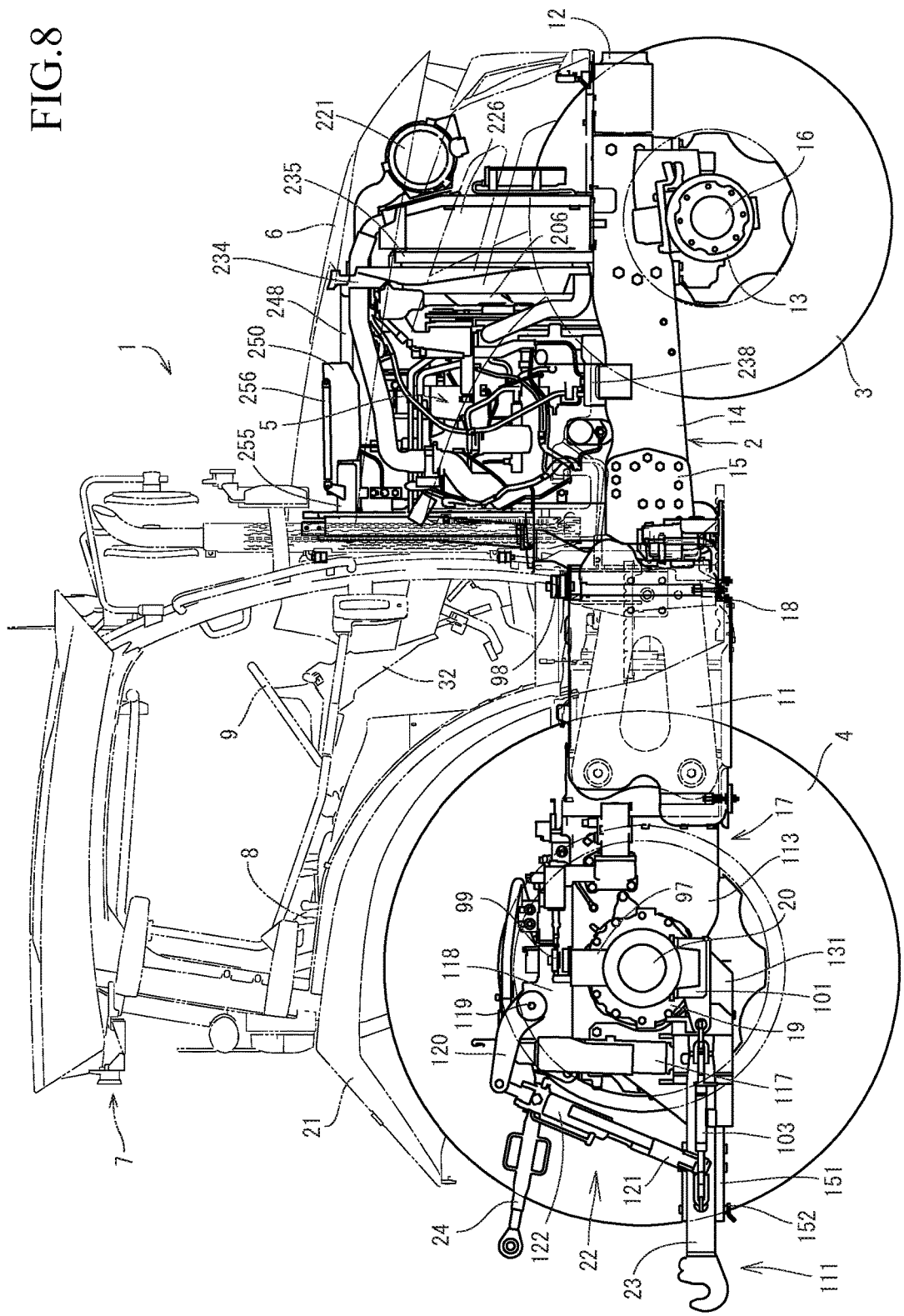
FIG. 8 is a right side view of the traveling machine body.
Figure 10:
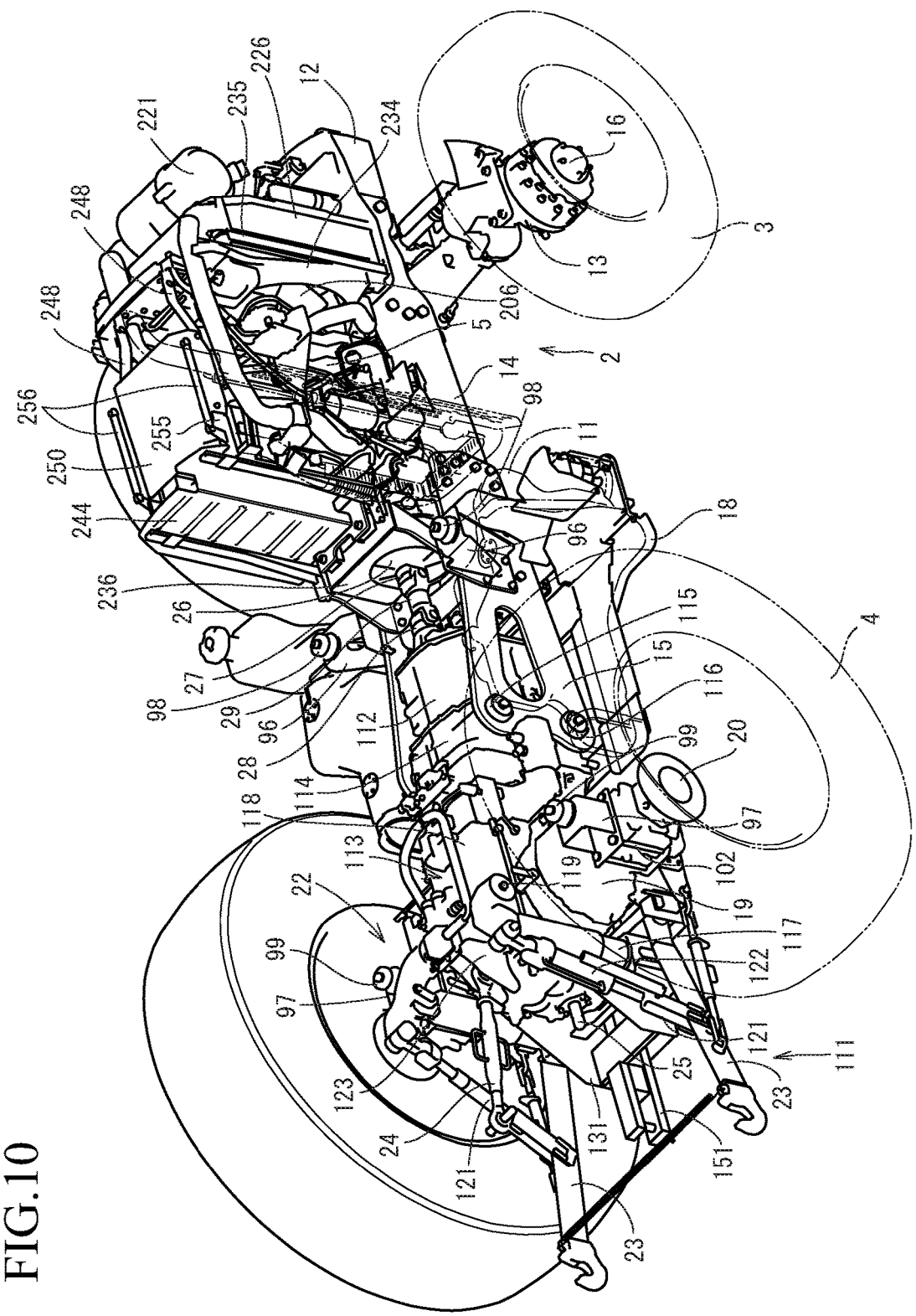
FIG. 10 is a perspective view of the traveling machine body as diagonally viewed from a rear right side.

As illustrated in figures such as FIGS. 7 and 10, left and right front supporting platforms 96 that support the front side of the cabin 7 and left and right rear supporting platforms 97 that support a rear portion of the cabin 7 are provided. The front supporting platforms 96 are bolted onto intermediate portions of vehicle outer side surfaces of the left and right vehicle body frames 15 in the front and rear direction. The cabin 7 has front side bottom portions supported on the upper surface sides of the front supporting platforms 96 in a vibration proof manner via anti-vibration rubber piece members 98. The rear supporting platforms 97 are bolted on left and right intermediate portions of the upper surfaces of left and right rear axle cases 19, in width direction. The rear axle cases 19 extend horizontally in the left and right direction. The cabin 7 has rear side bottom portions supported on the upper surface sides of the rear supporting platforms 97 in a vibration proof manner via anti-vibration rubber piece members 99. As illustrated in figures such as FIGS. 7 and 10, the rear supporting platforms 97 are disposed on the upper surface side of the rear axle cases 19 in such a manner as to sandwich the rear axle case 19 with a cross-sectional end surface having a substantially rectangular shape. A stopper bracket 101 is disposed on the lower surface side of the rear axle case 19, and is fastened to the rear supporting platform 97 with a bolt 102. A stopper rod member 103, with a turnbuckle that can be adjusted to extend and contract, has both end portions coupled to intermediate portions of the lower links 23, extending in the front and rear direction, and the stopper bracket 101. Thus, swing vibrations of the lower links 23 in the left and right direction are prevented.

Next, the diesel engine 5 below the hood 6 and an engine compartment structure are described with reference to figures such as FIG. 6, FIG. 9, and FIG. 10. The diesel engine 5 has a cylinder head mounted on a cylinder block incorporating an engine output shaft and a piston. The diesel engine 5 (cylinder head) has a right side surface provided with an intake manifold 203 and an EGR device 210. The intake manifold 203 is coupled to an air cleaner 221 via a turbo supercharger 211. The EGR device 210 partially recirculates exhaust gas from an exhaust manifold 204. When the exhaust gas discharged to the exhaust manifold 204 partially recirculates to the intake manifold 203, the maximum combustion temperature at the time of high load driving is reduced, whereby an amount of nitrogen oxides (NOx) discharged from the diesel engine 5 is reduced. The diesel engine 5 (cylinder head) has a left side surface provided with an exhaust manifold 204 coupled to a tail pipe 229 and the turbo supercharger 211. Thus, the engine 5 has the intake manifold 203 and the exhaust manifold 204 respectively arranged on the left and the right side surfaces along the engine output shaft, and a cooling fan 206 is disposed on the front surface side of the diesel engine 5 (cylinder block).

Figure 6:
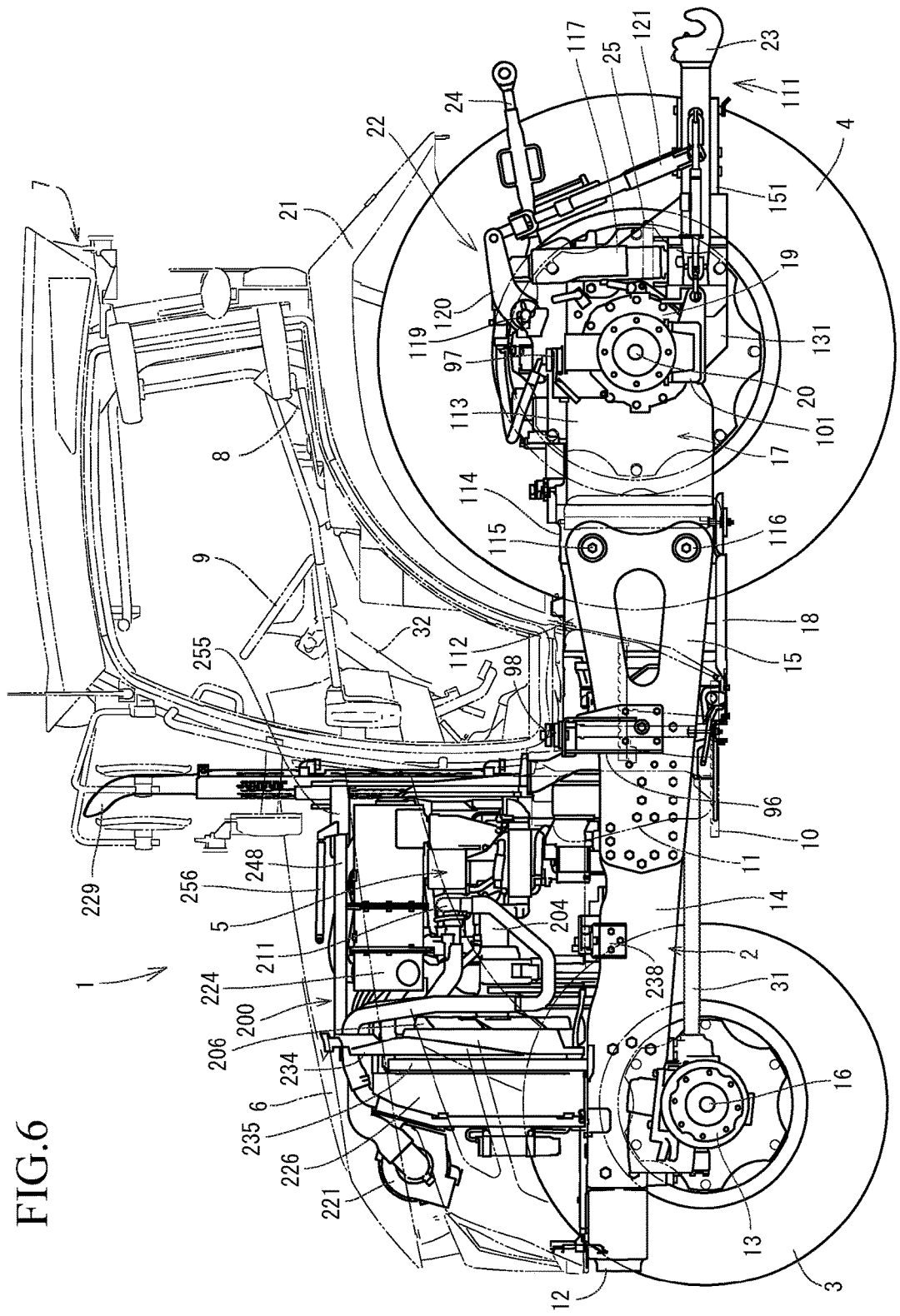
FIG. 6 is a left side view illustrating a detail structure of the traveling machine body.
Figure 9:
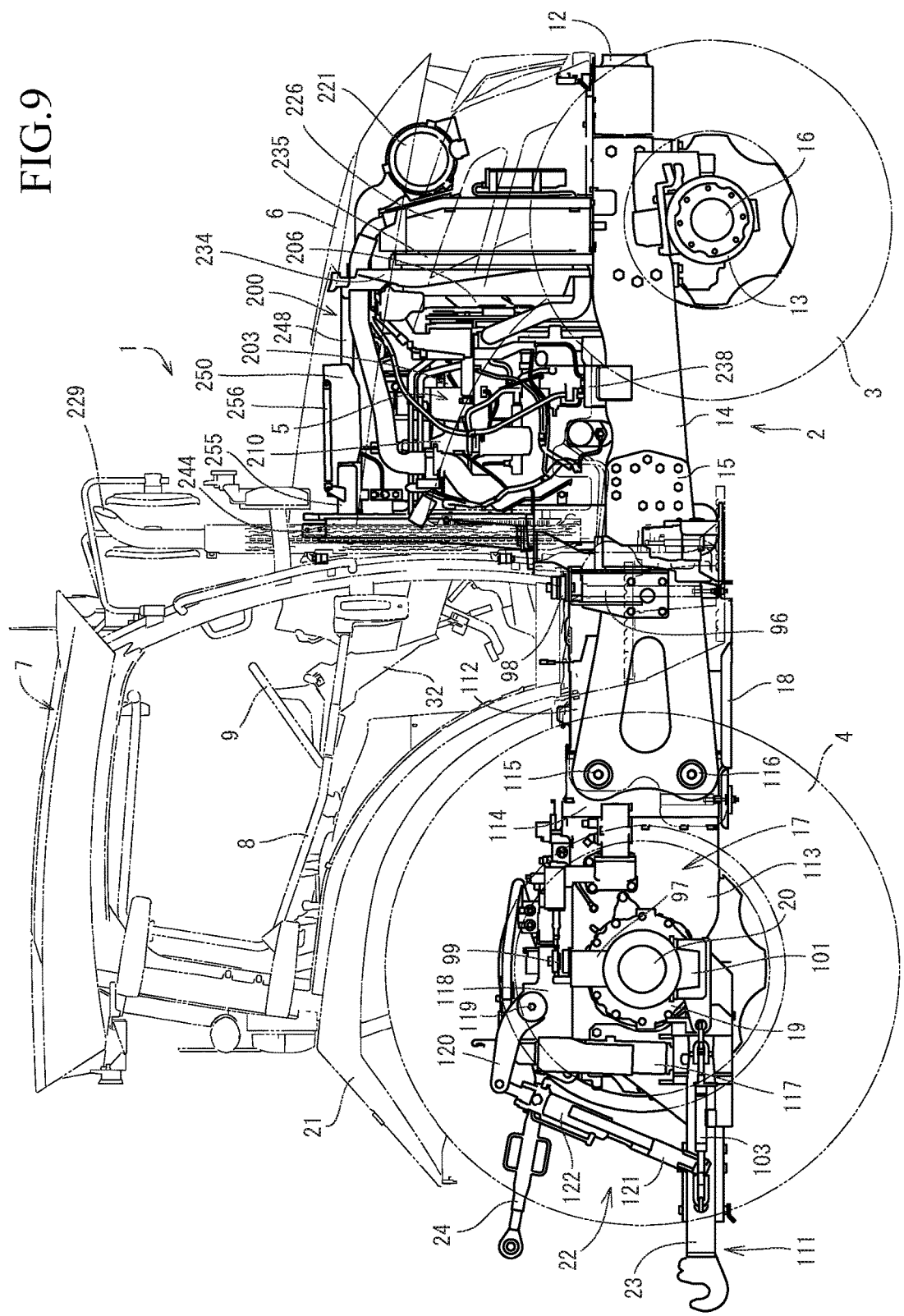
FIG. 9 is a right side view illustrating a detail structure of the traveling machine body.

As illustrated in figures such as FIG. 6, FIG. 9, and FIG. 10, the diesel engine 5 includes a continuously regenerating exhaust gas purifying device 224 (DPF) disposed on the upper surface side (above the exhaust manifold 204) of the diesel engine 5. The exhaust gas purifying device 224 has an exhaust side coupled to the tail pipe 229. The exhaust gas purifying device 224 removes particulate matters (PM), and reduces carbon oxide (CO) and hydrogen carbon (HC) in the exhaust gas discharged from the engine 5 to the outside of the vehicle through the tail pipe 229.

As illustrated in figures such as FIG. 1, FIG. 6, FIG. 9, and FIG. 10, the hood 6 has a front portion having the lower side provided with a front grille 231 covering the upper surface side and the front surface side of the engine compartment 200. Side engine covers 232 formed of porous plates are disposed on left and right lower sides of the hood 6 to cover left and right sides of the engine compartment 200. Thus, the hood 6 and the engine covers 232 cover the front, upper, left, and right sides of the diesel engine 5.

A radiator 235 having a rear surface side on which a fan shroud 234 is attached stands on the engine frame 14 to be positioned on the front surface side of the engine 5. The fan shroud 234 surrounds the outer circumference side of the cooling fan 206, and establishes a communication between the radiator 235 and the cooling fan 206. A rectangular frame 226 is provided on the front surface side of the radiator 235, and the air cleaner 221 is provided on an upper position of the front surface of the frame 226. The frame 226 includes the intercooler described above, as well as oil and fuel coolers and the like.

As illustrated in figures such as FIG. 10, the pair of left and right vehicle body frames 15 are coupled to each other via a supporting beam frame 236. The supporting beam frame 236 is bolted onto each of the vehicle body frames 15 to bridge between front end portions (engine 5 rear surface side) of the left and right vehicle body frames 15. The diesel engine 5 has a rear portion coupled to the upper surface of the supporting beam frame 236 via engine legs with anti-vibration rubber pieces. Left and right side surfaces of the front portion of the diesel engine 5 are coupled to intermediate portions of the pair of left and right engine frames 14, via left and right front engine legs 238 having anti-vibration rubber pieces. Thus, the diesel engine 5 has the front side supported in a vibration proof manner by the engine frame 14, and has a rear portion supported in a vibration proof manner by the front end side of the pair of left and right vehicle body frames 15 via the supporting beam frame 236.

A hood shield plate (shielding plate) 244 stands on the upper surface of the supporting beam frame 236 via the pair of left and right column frames and the like. The hood shield plate 244 covers the rear side of the hood 6. The engine compartment 200, incorporating the diesel engine 5, is formed by a space defined by the hood 6, the left and right side engine covers 232, the fan shroud 234, and the hood shield plate 244. The hood shield plate 244 is disposed while being separated from the front surface of the cabin 7, whereby a heat insulating layer is formed between the hood shield plate 244 and the cabin 7 disposed behind the hood 6. Thus, the side of the cabin 7 can be prevented from being heated by the exhaust heat from the engine compartment 200, whereby the operator in the cabin 7 can comfortably drive the vehicle without being affected by the exhaust heat from the diesel engine 5 and the exhaust gas purifying device 224.

A pair of left and right beam frames 248 bridge between an upper portion of the fan shroud 234 and an upper portion of the hood shield plate 244. With the upper portions of the fan shroud 234 and the hood shield plate 244 thus coupled to each other by the pair of beam frames 248, the members integrally form a rigid frame structure body as a whole for the engine compartment 200. A heat shield plate 250 has both left and right edges fixed to the pair of left and right beam frames 248, and thus covers the exhaust gas purifying device 224 on the upper side of the diesel engine 5. With the heat shield plate 250 disposed above the exhaust gas purifying device 224, the hood 6 can be prevented from being heated by the exhaust heat from the exhaust gas purifying device 224 and the diesel engine 5. Furthermore, a space is formed between the hood 6 and the heat shield plate 250, whereby the exhaust gas purifying device 224 can be operated in a high temperature environment with the inside of the engine compartment 200 below the heat shield plate 250 insulated from the outer air.

A hood supporting bracket 255 is disposed on an upper edge of the front surface of the hood shield plate 244 and pivotally supports a rear end portion of the hood 6, so that a front portion of the hood 6 can pivot about a hinge portion of the hood supporting bracket 255 to be opened and closed. Gas springs 256 that can make a telescopic movement are disposed on both left and right sides of the heat shield plate 250 below the hood 6. The pair of left and right gas springs 256 have one ends (read ends) pivotally attached to the rear end side of the pair of left and right beam frames 248, and have the other ends (front ends) pivotally attached to the upper inner side surfaces of the hood 6. Thus, when the front portion of the hood 6 is lifted, the front portion of the hood 6 pivots upwardly about the hinge portion of the hood supporting bracket 255, whereby the front portion upper surface side of the engine compartment 200 is open so that a maintenance work or the like can be performed on the diesel engine 5.

Next, an attachment structure for the hydraulic lifting and lowering mechanism 22 and a link mechanism 111 will be described with reference to FIG. 5 to FIG. 10. The transmission case 17 includes: a front transmission case 112 including a main transmission input shaft 28 and the like; a rear transmission case 113 including a rear axle case 19; and an intermediate case 114 that couples the front side of the rear transmission case 113 to the rear side of the front transmission case 112. The left and right vehicle body frames 15 have rear end portions coupled to the left and the right side surfaces of the intermediate case 114 via left and right upper and lower vehicle body coupling shaft members 115 and 116. The left and right vehicle body frames 15 have rear end portions coupled to the left and the right side surfaces of the intermediate case 114 via the two upper vehicle body coupling shaft members 115 and the two lower vehicle body coupling shaft members 116. Thus, the vehicle body frames 15 and the transmission case 17 are integrated for forming the rear portion of the traveling machine body 2. The front transmission case 112, the driving force transmission shaft 29, or the like is provided between the left and right vehicle body frames 15, whereby the front transmission case 112 or the like is protected. The left and the right rear axle cases 19 are attached on both the left and the right sides of the rear transmission case 113 in such a manner as to protrude outward. In the exemplary embodiment, the intermediate case 114 and the rear transmission case 113 are made of cast iron and the front transmission case 112 is made of die-cast aluminum.

In the configuration described above, the transmission case 17 is divided into three sections of the front transmission case 112, the intermediate case 114, and the rear case 113. Thus, the transmission case 17 can be assembled accurately and efficiently with the front transmission case 112, the intermediate case 114, and the rear transmission case 113 provided with parts such as a shaft and a gear in advance, and then assembled.

The left and the right rear axle cases 19 are attached to both left and right sides of the rear transmission case 113. The intermediate case 114 coupling the front transmission case 112 and the rear transmission case 113 to each other is coupled to the left and right vehicle body frames 15 forming the traveling machine body 2. Thus, for example, only the front transmission case 112 can be detached, for performing operations such as replacement of the shaft and the gear, with the intermediate case 114 and the rear transmission case 113 remaining attached to the vehicle body frames 15. Thus, the transmission case 17 as a whole is much less frequently removed (detached) from the tractor 1, whereby the maintenance and repairing can be performed with much higher operability.

The intermediate case 114 and the rear transmission case 113 are made of cast iron, and the front transmission case 112 is made of die-cast aluminum. Thus, the intermediate case 114 coupled to the vehicle body frames 15 and the rear transmission case 113 to which the left and right rear axle cases 19 are coupled can be formed as highly rigid members forming the traveling machine body 2. The front transmission case 112 is not a rigid member but can have a light weight. All things considered, the transmission case 17 as a whole can be made to have a light weight, with the traveling machine body 2 being sufficiently rigid.

The hydraulic lifting and lowering mechanism 22 includes left and right hydraulic lift cylinders 117, left and right lift arms 120, and left and right lift rods 121. The hydraulic lift cylinders 117 are operated and controlled in accordance with an operation on the one-touch lifting and lowering lever 34 or the work machine position dial 51. The lift arms 120 have base end sides pivotally supported by the openable upper surface lid member 118, provided on the side of the upper surface of the rear transmission case 113 in the transmission case 17, via a lift supporting shaft 119. The lift rods 121 couple the left and right lift arms 120 to the left and right lower links 23. The right lift rod 121 is partially formed of a horizontal cylinder 122 for hydraulic control, and thus the length of the right lift rod 121 can be adjusted to be increased or reduced.

As illustrated in figures such as FIG. 7 and FIG. 10, a top link hinge 123 is fixed to the rear surface side of the upper surface lid member 118, and the top link 24 is coupled to the top link hinge 123 via a hinge pin. When the piston of the horizontal cylinder 122 is extended and contracted for changing the length of the right lift rod 121 with the ground working machine being supported by the top link 24 and the left and right lower links 23, the left and right inclined angle of the ground working machine change.

Next, an internal structure of the transmission case 17 and a driving force transmission system of the tractor 1 are described with reference to FIG. 11 to FIG. 19. The transmission case 17 includes: the front transmission case 112 including the main transmission input shaft 28 and the like; the rear transmission case 113 including the rear axle case 19 and the like; and the intermediate case 114 coupling the front side of the rear transmission case 113 to the rear side of the front transmission case 112. The transmission case 17 has a hollow box shape as a whole.

A front lid member 491 is disposed on a front surface of the transmission case 17, that is, a front surface of the front transmission case 112. The front lid member 491 is detachably fastened to the front surface of the front transmission case 112 with a plurality of bolts. A rear lid member 492 is disposed on a rear surface of the transmission case 17, that is, a rear surface of the rear transmission case 113. The rear lid member 492 is detachably fastened to the rear surface of the rear transmission case with a plurality of bolts. An intermediate partitioning wall 493, partitioning between the front transmission case 112 and the intermediate case 114, is integrally formed on the front surface side in the intermediate case 114. A rear partitioning wall 494 that partitions between front and rear portions in the rear transmission case 113 is integrally formed on an intermediate portion of the rear transmission case 113 in the front and rear direction.

Thus, the inside of the transmission case 17 is divided, by the intermediate and the rear partitioning walls 493 and 494, into three chambers including a front chamber 495, a rear chamber 496, and an intermediate chamber 497. The front chamber 495 is a space in the transmission case 17 between the front lid member 491 and the intermediate partitioning wall 493 (in the front transmission case 112). The rear chamber 496 is provided between the rear lid member 492 and the rear partitioning wall 494 (a rear portion inside the rear transmission case 113). The intermediate chamber 497 is a space between the intermediate partitioning wall 493 and the rear partitioning wall 494 (inside the intermediate case 114 and a front side in the rear transmission case 113). The partitioning walls 493 and 494 are partially notched so that the front chamber 495, the intermediate chamber 497, and the rear chamber 496 communicate with each other. Thus, hydraulic oil (lubricant oil) can move among the chambers 495 to 497.

The hydraulic continuously variable transmission 500, a mechanical creep transmission gear mechanism 502, a traveling sub transmission gear mechanism 503, and a two-wheel drive/four-wheel drive switching mechanism 504 are disposed in the front chamber 495 of the transmission case 17 (in the front transmission case 112). The creep transmission gear mechanism 502 shifts the rotational driving force transmitted thereto via the forward/backward traveling switching mechanism 501 described later. The two-wheel drive/four-wheel drive switching mechanism 504 switches between two-wheel drive and four-wheel drive of the front and the rear wheels 3 and 4. The forward/backward traveling switching mechanism 501, a PTO transmission mechanism 505, and the rear wheel differential gear mechanism 506 are disposed in the intermediate chamber 497 of the transmission case 17 (in the intermediate case 114 and on the front side of the rear transmission case 113). The forward/backward traveling switching mechanism 501 switches the rotational driving force from the hydraulic continuously variable transmission 500 between the normal and reverse rotation directions. The PTO transmission mechanism 505 appropriately shifts the rotational driving force from the engine 5, and transmits the rotational driving force to the PTO shaft 25. The rear wheel differential gear mechanism 506 transmits the rotational driving force from the creep transmission gear mechanism 502 or the traveling sub transmission gear mechanism 503 to the left and right rear wheels 4. The creep transmission gear mechanism 502 and the traveling sub transmission gear mechanism 503 correspond to the traveling transmission gear mechanism achieving multistage shifting of the shifted output from the forward/backward traveling switching mechanism 501. A pump case 480 accommodating a traveling hydraulic pump 481 and a working machine hydraulic pump 482 driven by the rotational driving force from the engine 5, is attached to the front portion of the left outer surface of the rear transmission case 113.

As illustrated in FIG. 1, FIG. 7, and FIG. 10, the flywheel 26 is directly coupled to the output shaft of the engine 5 protruding rearward from the rear side surface of the engine 5. The main transmission input shaft 28 is coupled to the main driving shaft 27 protruding rearward from the flywheel 26, via the driving force transmission shaft 29 having universal joints on both ends. The main transmission input shaft 28 protrudes forward from the front surface (front lid member 491) side of the transmission case 17. The rotational driving force from the engine 5 is transmitted to the main transmission input shaft 28 of the transmission case 17 (front transmission case 112) via the main driving shaft 27 and the driving force transmission shaft 29. Then the driving force is appropriately shifted by the hydraulic continuously variable transmission 500 and the creep transmission gear mechanism 502 or the traveling sub transmission gear mechanism 503, and then is transmitted to the rear wheel differential gear mechanism 506. Thus, the left and right rear wheels 4 are driven. The shifted driving force from the creep transmission gear mechanism 502 or the traveling sub transmission gear mechanism 503 is transmitted to the front wheel differential gear mechanism 507 in the front axle casing 13, from the two-wheel drive/four-wheel drive switching mechanism 504 via the front wheel output shaft 30, the front wheel driving shaft 31, and the front wheel transmission shaft 508. Thus, the left and right front wheels 3 are driven.

The main transmission input shaft 28, protruding forward from the front lid member 491, extends in the front and rear direction, from the front transmission case 112 to the intermediate case 114 (from the front chamber 495 to the intermediate chamber 497). The intermediate partitioning wall 493 rotatably supports the intermediate portion of the main transmission input shaft 28 in the front and rear direction. The main transmission input shaft 28 has a rear end side rotatably supported by an intermediate supporting plate 498 detachably fastened on the front surface side (side of the intermediate chamber 497) of the rear partitioning wall 494. The intermediate supporting plate 498 and the rear partitioning wall 494 are disposed in such a manner that a gap in the front and rear direction is provided between the members 498 and 494. An input transmission shaft 511, arranged in parallel with the main transmission input shaft 28, extends from the front transmission case 112 to the intermediate case 114 (from the front chamber 495 to the intermediate chamber 497) and receives the driving force from the main transmission input shaft 28. The hydraulic continuously variable transmission 500 is disposed in the front transmission case 112 (in the front chamber 495) via the input transmission shaft 511. The front side of the hydraulic continuously variable transmission 500 is attached to the inner surface side of the front lid member 491 that is detachably attached to close the opening on the front surface of the front transmission case 112. The input transmission shaft 511 has a rear end side rotatably supported by the intermediate supporting plate 498 and the rear partitioning wall 494.

In the configuration described above, the main transmission input shaft 28, receiving the driving force from the engine 5, and the input transmission shaft 511, receiving the driving force from the main transmission input shaft 28, are arranged in parallel with each other and extend from the front transmission case 112 to the intermediate case 114. The hydraulic continuously variable transmission 500 is disposed in the front transmission case 112 via the input transmission shaft 511 (in particular, the hydraulic continuously variable transmission 500 is attached on the inner surface side of the front lid member 491 that is detachably attached to close the opening on the front surface of the front transmission case 112). Thus, for example, the hydraulic continuously variable transmission 500 can be exposed by detaching only the front transmission case 112 with the intermediate case 114 and the rear transmission case 113 remain attached to the vehicle body frames 15. Thus, a higher maintainability can be achieved for the hydraulic continuously variable transmission 500 disposed in the transmission case 17.

The hydraulic continuously variable transmission 500 in the front chamber 495 is of an inline type with a main transmission output shaft 512 coaxially disposed with the input transmission shaft 511. The main transmission output shaft 512 having a cylindrical shape is fit on a portion of the input transmission shaft 511 inside the intermediate chamber 497. The main transmission output shaft 512 has a front end side disposed through the intermediate partitioning wall 493 to be rotatably supported by the intermediate partitioning wall 493. The main transmission output shaft 512 has a rear end side rotatably supported by the intermediate supporting plate 498. Thus, the rear end side, as the input side, of the input transmission shaft 511 protrudes rearward beyond the read end of the main transmission output shaft 512. A main transmission input gear 513 is fit on the rear end side of the main transmission input shaft 28 (between the intermediate supporting plate 498 and the rear partitioning wall 494) in a relatively non-rotatable manner. An input transmission gear 514, constantly in mesh with the main transmission input gear 513, is fixed to the read end side of the input transmission shaft 511 (between the intermediate supporting plate 498 and the rear partitioning wall 494). Thus, the rotational driving force from the main transmission input shaft 28 is transmitted to the hydraulic continuously variable transmission 500 via the main transmission input gear 513, the input transmission gear 514, and the input transmission shaft 511. A main transmission high speed gear 516, a main transmission reverse gear 517, and a main transmission low speed gear 515, for traveling output, are fit on the main transmission output shaft 512 in a relatively non-rotatable manner.

The hydraulic continuously variable transmission 500 includes: a variable capacity hydraulic pump unit 521; and a fixed capacity hydraulic motor unit 522 operated by high pressure hydraulic oil discharged from the hydraulic pump unit 521. The hydraulic pump unit 521 includes a pump swash plate 523 of which an inclined angle relative to the axis of the input transmission shaft 511 can be changed for adjusting the supplied amount of the hydraulic oil. A main transmission hydraulic cylinder 524 for changing and adjusting the inclined angle of the pump swash plate 523 relative to the axis of the input transmission shaft 511 is coupled to and interlocked with the pump swash plate 523. In the embodiment, the main transmission hydraulic cylinder 524 is assembled to the hydraulic continuously variable transmission 500 to be a unit as a single member. By driving the main transmission hydraulic cylinder 524 to change the inclined angle of the pump swash plate 523, a main transmission operation of the hydraulic continuously variable transmission 500 is performed with the amount of the hydraulic oil supplied to the hydraulic motor unit 522 from the hydraulic pump unit 521 changed and adjusted.

Specifically, when the main transmission hydraulic cylinder 524 is driven in proportion to the amount of operation on the main transmission lever 50, the inclined angle of the pump swash plate 523 relative to the axis of the input transmission shaft 511 is changed accordingly. The angle of the pump swash plate 523 according to the embodiment can be adjusted with a range between the maximum inclined angles on one side (positive side) and the other side (negative side) of a neutral angle corresponding to the substantially zero inclined angle (±several angles from the zero angle), based on an inclined angle on one side when the vehicle speed of the traveling machine body 2 is the lowest (the inclined angle close to the maximum negative angle in this case).

When the inclined angle of the pump swash plate 523 is substantially zero (neutral angle), the hydraulic motor unit 522 in the hydraulic pump unit 521 is not driven, and the main transmission output shaft 512 rotates at the substantially the same rotation speed as the input transmission shaft 511. When the pump swash plate 523 is inclined toward the one side (positive inclined angle) relative to the axis of the input transmission shaft 511, the hydraulic pump unit 521 causes the hydraulic motor unit 522 to perform an accelerating operation, whereby the main transmission output shaft 512 rotates at a higher rotation speed than the input transmission shaft 511. Thus, the driving force corresponding to the sum of the rotation speed of the input transmission shaft 511 and the rotation speed of the hydraulic motor unit 522 is transmitted to the main transmission output shaft 512. As a result, the shifted driving force (vehicle speed) from the main transmission output shaft 512 changes in proportion to the inclined angle (positive inclined angle) of the pump swash plate 523 in a rotation speed range higher than the rotation speed of the input transmission shaft 511. The vehicle speed of the traveling machine body 2 is at the maximum vehicle speed, when the inclined angle of the pump swash plate 523 is close to the maximum positive inclined angle.

When the pump swash plate 523 is inclined toward the other side (negative inclined angle) relative to the axis of the input transmission shaft 511, the hydraulic pump unit 521 causes the hydraulic motor unit 522 to perform decelerating (reverse) operation, whereby the main transmission output shaft 512 rotates at a lower rotation speed than the input transmission shaft 511. Thus, the driving force corresponding to a result of subtracting the rotation speed of the hydraulic motor unit 522 from the rotation speed of the input transmission shaft 511 is transmitted to the main transmission output shaft 512. As a result, the shifted driving force from the main transmission output shaft 512 changes in proportion to the inclined angle (negative inclined angle) of the pump swash plate 523 in a rotation speed range lower than the rotation speed of the input transmission shaft 511. The traveling machine body 2 is at the lowest vehicle speed when the inclined angle of the pump swash plate 523 is close to the maximum negative inclined angle.

A pump drive gear 484 is fit on a pump drive shaft 483, for driving both the working machine and traveling hydraulic pumps 481 and 482, in a relatively non-rotatable manner. The pump drive gear 484 is coupled to the main transmission input gear 513 of the main transmission input shaft 28 via a flat gear mechanism 485, in a driving force transmittable manner. A lubricant oil pump 518 for supplying the hydraulic oil for lubrication to the hydraulic continuously variable transmission 500, the forward/backward traveling switching mechanism 501, and the like, is provided between the intermediate supporting plate 498 and the rear partitioning wall 494. A pump gear 520 fixed to a pump shaft 519 of the lubricant oil pump 518 is constantly in mesh with the input transmission gear 514 of the input transmission shaft 511. The working machine and traveling hydraulic pumps 481 and 482 and the lubricant oil pump 518 are driven by the rotational driving force from the engine 5.

Next, a structure for switching between the forward traveling and the backward traveling via the forward/backward traveling switching mechanism 501 is described. A planetary gear mechanism 526 as a forward traveling high speed gear mechanism and a pair of low speed gears 525 as a forward traveling low speed gear mechanism are disposed on portions of the main transmission input shaft 28 in the intermediate chamber 497 (on the rear side of the main transmission input shaft 28). The planetary gear mechanism 526 includes: a sun gear 531 that integrally rotates with an input side transmission gear 529 rotatably supported on the main transmission input shaft 28; a carrier 532 rotatably supporting a plurality of planetary gears 533 on the same radius; and a ring gear 534 with an inner circumference surface provided with internal teeth. The sun gear 531 and the ring gear 534 are rotatably fit on the main transmission input shaft 28. The carrier 532 is fit on the main transmission input shaft 28 in a relatively non-rotatable manner. The sun gear 531 meshes with the planetary gears 533 of the carrier 532 from a radially inner side. The internal teeth of the ring gear 534 mesh with the planetary gears 533 from a radially outer side. The main transmission input shaft 28 further rotatably supports an output side transmission gear 530 that integrally rotates with the ring gear 534. An input side low speed gear 527 and an output side low speed gear 528, forming the pair of low speed gears 525, form an integrated structure, and is rotatably supported on a portion of the main transmission input shaft 28 between the planetary gear mechanism 526 and the main transmission input gear 513.

A traveling relay shaft 535 and a traveling transmission shaft 536, extending in parallel with the main transmission input shaft 28, the input transmission shaft 511, and the main transmission output shaft 512, are disposed in the intermediate chamber 497 of the transmission case 17 (in the intermediate case 114 and on the front side in the rear transmission case 113). The traveling relay shaft 535 has a front end side rotatably supported by the intermediate partitioning wall 493. The traveling relay shaft 535 has a rear end side rotatably supported by the intermediate supporting plate 498. The traveling transmission shaft 536 has a front end side rotatably supported by the intermediate partitioning wall 493. The traveling transmission shaft 536 has a rear end side rotatably supported by the intermediate supporting plate 498.

The traveling relay shaft 535 is provided with the forward/backward traveling switching mechanism 501. More specifically, a front traveling high speed gear 540, a backward traveling gear 542, and a forward traveling low speed gear 538 are fit on the traveling relay shaft 535. The front traveling high speed gear 540 is coupled with a multiple wet forward traveling high speed hydraulic clutch 539. The backward traveling gear 542 is coupled with a multiple wet backward traveling hydraulic clutch 541. The forward traveling low speed gear 538 is coupled with a multiple wet forward traveling low speed hydraulic clutch 537. A traveling relay gear 543 is fit on a portion of the traveling relay shaft 535 between the forward traveling high speed hydraulic clutch 539 and the backward traveling gear 542 in a relatively non-rotatable manner. A traveling transmission gear 544, constantly in mesh with the traveling relay gear 543, is fit on the traveling transmission shaft 536 in a relatively non-rotatable manner. The input side low speed gear 527 of the pair of low speed gears 525 on the side of the main transmission input shaft 28 is constantly in mesh with the main transmission low speed gear 515 of the main transmission output shaft 512. The output side low speed gear 528 is constantly in mesh with the forward traveling low speed gear 538. The input side transmission gear 529 of the planetary gear mechanism 526 on the side of the main transmission input shaft 28 is constantly in mesh with the main transmission high speed gear 516 of the main transmission output shaft 512. The output side transmission gear 530 is constantly in mesh with the front traveling high speed gear 540. The main transmission reverse gear 517 of the main transmission output shaft 512 is constantly in mesh with the backward traveling gear 542.

When a forward traveling side operation is performed on the forward and backward travel switching lever 36, the forward traveling low speed hydraulic clutch 537 or the forward traveling high speed hydraulic clutch 539 transitions to a driving force connected state, and the forward traveling low speed gear 538 or the front traveling high speed gear 540 and the traveling relay shaft 535 are coupled to each other in a relatively non-rotatable manner. As a result, the forward traveling low speed or forward traveling high speed rotational driving force is transmitted from the main transmission output shaft 512 to the traveling relay shaft 535 via the pair of low speed gears 525 or the planetary gear mechanism 526. Thus, the driving force is transmitted from the traveling relay shaft 535 to the traveling transmission shaft 536. When a backward traveling side operation is performed on the forward and backward travel switching lever 36, the backward traveling hydraulic clutch 541 transitions to the driving force connected state, and the backward traveling gear 542 and the traveling relay shaft 535 are coupled to each other in a relatively non-rotatable manner. As a result, backward traveling rotational driving force is transmitted from the main transmission output shaft 512 to the traveling relay shaft 535 via the pair of low speed gears 525 or the planetary gear mechanism 526, and the driving force is transmitted from the traveling relay shaft 535 to the traveling transmission shaft 536.

Which one of the forward traveling low speed hydraulic clutch 537 and the forward traveling high speed hydraulic clutch 539 transitions to the driving force connected state due to the forward traveling side operation on the forward and backward travel switching lever 36 is determined in accordance with an amount of operation on the main transmission lever 50. When the forward and backward travel switching lever 36 is at the neutral position, all the hydraulic clutches 537, 539, and 541 are in a driving force disconnected state, and the traveling driving force from the main transmission output shaft 512 is substantially zero (main clutch disengaged state).

In the configuration described above, the main transmission input shaft 28 receiving the driving force from the engine 5 and the input transmission shaft 511 receiving the driving force from the main transmission input shaft 28 extend from the front transmission case 112 to the intermediate case 114 while being arranged in parallel with each other. In the front transmission case 112, the hydraulic continuously variable transmission 500 is disposed via the input transmission shaft 511. In the intermediate case 114, the forward/backward traveling switching mechanism 501 is disposed that switches the output from the hydraulic continuously variable transmission 500 between the normal and reverse rotation directions. Thus, the traveling power transmission system can be collectively accommodated in the front transmission case 112 and the intermediate case 114 (front portion of the transmission case 17), whereby a higher assemblability and maintainability can be achieved for the traveling power transmission system and the transmission case 17.

Next, a structure of switching among ultra-low speed, low speed, and high speed via the creep transmission gear mechanism 502 and the traveling sub transmission gear mechanism 503 as the traveling transmission gear mechanism will be described. The mechanical creep transmission gear mechanism 502 and the traveling sub transmission gear mechanism 503, for shifting the rotational driving force transmitted via the forward/backward traveling switching mechanism 501, are disposed in the front chamber 495 of the transmission case (in the front transmission case 112). In this configuration, a traveling counter shaft 545, coaxially extending with the traveling transmission shaft 536, is disposed in the front chamber 495 (in the front transmission case 112). A sub transmission shaft 546 extends from the front transmission case 112 to the rear transmission case 113 (from the front chamber 495 to the rear chamber 496 via the intermediate chamber 497) while being in parallel with the traveling counter shaft 545. The traveling counter shaft 545 has the front end side rotatably supported by the front lid member 491. The traveling counter shaft 545 has the rear end side rotatably supported by the intermediate partitioning wall 493. The sub transmission shaft 546 has the front end side rotatably supported by the front lid member 491. The sub transmission shaft 546 has an intermediate portion, in the front and rear direction, rotatably supported by the intermediate partitioning wall 493. The sub transmission shaft 546 has the rear end side rotatably supported by the intermediate supporting plate 498 and the rear partitioning wall 494.

The traveling counter shaft 545 has a rear side provided with a transmission gear 547 and a creep gear 548. The transmission gear 547 is rotatably fit on the traveling counter shaft 545, and is rotatably supported by the intermediate partitioning wall 493 while being coupled to the traveling transmission shaft 536 in an integrally rotating manner. The creep gear 548 is fit on the traveling counter shaft 545 in a relatively non-rotatable manner. A creep shifter 549 is spline fit to a portion of the traveling counter shaft 545 between the transmission gear 547 and the creep gear 548, in such a manner as to be relatively non-rotatable and slidable in an axial direction. When the ultra-low speed lever 44 is operated to turn ON and OFF, the creep shifter 549 slides in such a manner that the transmission gear 547 or the creep gear 548 is selectively coupled to the traveling counter shaft 545. A pair of reduction gears 550 are rotatably fit on a portion of the sub transmission shaft 546 inside the front chamber 495 (front transmission case 112). The pair of reduction gears 550 include an input side reduction gear 551 and an output side reduction gear 552 that form an integrated structure. The transmission gear 547 of the traveling counter shaft 545 is constantly in mesh with the input side reduction gear 551 of the sub transmission shaft 546, and the creep gear 548 is constantly in mesh with the output side reduction gear 552.

The traveling counter shaft 545 has a front side provided with a low speed relay gear 553 and a high speed relay gear 554. The low speed relay gear 553 is fixed to the traveling counter shaft 545. The high speed relay gear 554 is fit on the traveling counter shaft 545 in a relatively non-rotatable manner. A low speed gear 555 and a high speed gear 556 are rotatably fit on a portion of the sub transmission shaft 546 further toward the front side than the pair of reduction gears 550. The low speed gear 555 meshes with the low speed relay gear 553. The high speed gear 556 meshes with the high speed relay gear 554. A sub transmission shifter 557 is spline fit to a portion of the sub transmission shaft 546 between the low speed gear 555 and the high speed gear 556 in such a manner as to be relatively non-rotatable and slidable in the axial direction. When the sub transmission lever 45 is operated, the sub transmission shifter 557 slides in such a manner that the low speed gear 555 or the high speed gear 556 is selectively coupled to the sub transmission shaft 546.

In the embodiment, when the ultra-low speed lever 44 is operated to be ON and the sub transmission lever 45 is operated to be on the low speed side, the creep gear 548 is coupled to the traveling counter shaft 545 in a relatively non-rotatable manner, and the low speed gear 555 is coupled to the sub transmission shaft 546 in a relatively non-rotatable manner. Thus, the ultra-low speed traveling driving force is output to the front wheels 3 and/or the rear wheels 4 from the traveling transmission shaft 536 via the traveling counter shaft 545 and the sub transmission shaft 546. The ultra-low speed lever 44 and the sub transmission lever 45 are coupled to each other in an interlocking manner via a restraining mechanism (not illustrated) so that the sub transmission lever 45 cannot be operated to be on the high speed side, when the ultra-low speed lever 44 is in the state of being operated to be ON.

When the ultra-low speed lever 44 is operated to be OFF and the sub transmission lever 45 is operated to be on the low speed side, the transmission gear 547 is coupled to the traveling counter shaft 545 in a relatively non-rotatable manner and the low speed gear 555 is coupled to the sub transmission shaft 546 in a relatively non-rotatable manner. Thus, low speed traveling driving force is output from the traveling transmission shaft 536 to the front wheels 3 and/or the rear wheels 4 via the traveling counter shaft 545 and the sub transmission shaft 546. When the ultra-low speed lever 44 is operated to be OFF and the sub transmission lever 45 is operated to be on the high speed side, the transmission gear 547 is coupled to the traveling counter shaft 545 in a relatively non-rotatable manner and the high speed gear 556 is coupled to the sub transmission shaft 546 in a relatively non-rotatable manner. Thus, the high speed traveling driving force is output from the traveling transmission shaft 536 to the front wheels 3 and/or the rear wheels 4 via the traveling counter shaft 545 and the sub transmission shaft 546.

In the embodiment, the hydraulic continuously variable transmission 500 is disposed in the front transmission case 112 (front chamber 495) to be positioned higher than the creep transmission gear mechanism 502 and the traveling sub transmission gear mechanism 503 as the traveling transmission gear mechanism. Thus, the traveling transmission gear mechanisms (the creep transmission gear mechanism 502 and the traveling sub transmission gear mechanism 503), with smaller resistance to stirring of the hydraulic oil in the transmission case 17 compared with the hydraulic continuously variable transmission 500, are at a low position. Thus, a risk of stirring the hydraulic oil in the transmission case 17 in the hydraulic continuously variable transmission 500 can be reduced (the resistance to stirring the hydraulic oil due to the hydraulic continuously variable transmission 500 can be reduced). This contributes to an improvement of the transmission efficiency of the hydraulic continuously variable transmission 500.

The intermediate case 114 and the rear transmission case 113 are made of cast iron, and the front transmission case 112 is made of die-cast aluminum. The creep transmission gear mechanism 502 and the traveling sub transmission gear mechanism 503, serving as the traveling transmission gear mechanisms for multistage shifting of the output from the forward/backward traveling switching mechanism 501, are further provided in the front transmission case 112. Thus, the forward/backward traveling switching mechanism 501 is provided on a side of the intermediate case 114 which is heavy, whereas the hydraulic continuously variable transmission 500 and the creep transmission gear mechanism 502 and the traveling sub transmission gear mechanism 503 as the traveling transmission gear mechanism are provided on the side of the front transmission case 112, which is light. Thus, the transmission case 17 can have an excellent weight balance.

The sub transmission shaft 546 has a rear end side extending through the rear partitioning wall 494 and into the rear chamber 496. The sub transmission shaft 546 has a rear end portion provided with a pinion 558. The rear wheel differential gear mechanism 506, which transmits the traveling driving force to the left and right rear wheels 4, is disposed in the rear chamber 496 (inside the rear transmission case 113 on the rear side). The rear wheel differential gear mechanism 506 includes: a ring gear 559 that meshes with the pinion 558 of the sub transmission shaft 546; a differential gear case 560 provided to the ring gear 559; and a pair of differential output shafts 561 extending in the left and right direction. The differential output shaft 561 is coupled to the rear axles 20 via a final gear 562 and the like. The rear wheels 4 are attached on the distal end side of the rear axle 20.

The left and right differential output shafts 561 are each provided with a brake mechanism 563. The brake mechanism 563 puts a brake on the left and right rear wheels 4 with two systems corresponding to operating and automatic controlling of the brake pedal 35. Specifically, each brake mechanism 563 is configured to put a brake on the corresponding differential output shaft 561 and the rear wheel 4 in accordance with a depression operation on the brake pedal 35. When a steering angle of the steering wheel 9 reaches or exceeds a predetermined angle, a brake cylinder 630 (see FIG. 20) is operated in accordance with a switching operation of an auto brake solenoid valve 631 (see FIG. 20) for one of the rear wheels 4 on the inner side of the turning vehicle. Thus, the brake mechanism 563 for the one of the rear wheels 4 on the inner side of the turning vehicle is automatically operated for braking. Thus, the tractor 1 can be easily make a small turn such as U turn (turning the direction at the headland of the farm field).

The rear wheel differential gear mechanism 506 is provided with a diff-lock mechanism 585 for stopping the differential operation of the rear wheel differential gear mechanism 506 (for constantly driving the left and right differential output shafts 561 at the same speed). When the diff-lock pin in the diff-lock mechanism 585 is engaged with the differential gear of the differential gear case 560 due to the depression operation on the diff-lock pedal 47, the differential gear is fixed to the differential gear case 560. Thus, the differential function of the differential gear stops, and the left and right differential output shafts 561 are driven at the same speed.

A parking brake shaft 564 has a longitudinal direction in the front and rear direction and extends in parallel with the sub transmission shaft 546 from the intermediate chamber 497 to the rear chamber 496 in the rear transmission case 113. A parking brake gear 565 is fit on the front end side of the parking brake shaft 564 in a relatively non-rotatable manner. The parking brake gear 565 is constantly in mesh with a lock gear 566 fit on a portion of the sub transmission shaft 546 inside the intermediate chamber 497, in a relatively non-rotatable manner. A parking brake 567 such as a wet multiple disk is provided to a portion of the parking brake shaft 564 between the intermediate supporting plate 498 and the rear partitioning wall 494. When the parking brake 567 performs a braking operation due to the braking operation on the parking brake lever 43, the parking brake shaft 564 and the parking brake gear 565 are locked to be non-rotatable. As a result, the lock gear 566 and thus the sub transmission shaft 546 are locked to be non-rotatable, whereby the braking is applied to both left and right rear wheels 4.

In the configuration described above, the parking brake 567 is disposed in the transmission case 17, separately from the left and right brake mechanisms 563 for putting a brake on the left and right rear wheels 4. The parking brake 567 maintains the braking state of the rear wheel differential gear mechanism 506. Thus, the braking for the traveling and the braking for the parking can be separately executed by different brakes (the brake mechanism 563 and the parking brake 567). Thus, durability of both the brake mechanism 563 and the parking brake 567 can be improved.

The front chamber 495, the intermediate chamber 497, and the rear chamber 496 are formed in the transmission case 17. The parking brake 567 is positioned on the side of the intermediate chamber 496. The rear wheel differential gear mechanism 506 is positioned on the side of the rear chamber 496. The intermediate supporting plate 498 is detachably fastened to the front surface side of the rear partitioning wall 494 partitioning between intermediate chamber 497 and the rear chamber 496. The intermediate supporting plate 498 supports the parking brake 567. Thus, the parking brake 567 can apply braking to the differential mechanism 506 on the upstream side of the brake mechanism 563, whereby the braking state of the traveling machine body 1 can be certainly maintained. The intermediate supporting plate 498 incorporates the entire parking brake 567. Thus, the intermediate supporting plate 498 can be attached to the rear partitioning wall 494 together with the parking brake 567. Thus, the assemblability of the transmission case 17 can be improved, and the parking brake 567 can be stably and accurately attached.

Next, the structure for switching between the two-wheel drive and the four-wheel drive of the front and the rear wheels 3 and 4 executed via the two-wheel drive/four-wheel drive switching mechanism 504 will be described. The two-wheel drive/four-wheel drive switching mechanism 504 is disposed in the front chamber 495 (front transmission case 112) of the transmission case. In this configuration, the front wheel input shaft 568 and the front wheel output shaft 30, extending in parallel with the traveling counter shaft 545 and the sub transmission shaft 546, are disposed in the front chamber 495 (the front transmission case 112). A driving gear 569 is fit on the front end side of the sub transmission shaft 546 in a relatively non-rotatable manner and is constantly in mesh with a driven gear 570 fit on the front wheel input shaft 568 in a relatively non-rotatable manner. A double speed relay gear 571 and a four-wheel drive relay gear 572 are respectively disposed on both front and rear sides of the driven gear 570 on the front wheel input shaft 568, in a relatively non-rotatable manner.

The wheel output shaft 30 is provided with the two-wheel drive/four-wheel drive switching mechanism 504. Specifically, a double speed gear 574 and a four-wheel drive gear 576 are fit on the front wheel output shaft 30. The double speed gear 574 is coupled with a wet multi double speed hydraulic clutch 573. The four-wheel drive gear 576 is coupled with a wet multi four-wheel drive hydraulic clutch 575. The double speed relay gear 571 of the front wheel input shaft 568 is constantly in mesh with the double speed gear 574 of the front wheel output shaft 30, and the four-wheel drive relay gear 572 is in mesh with the four-wheel drive gear 576.

When a driving switching switch or a driving switching lever (not illustrated) is operated to be on the four-wheel drive side, the four-wheel drive hydraulic clutch 575 is in the driving force connected state and the front wheel output shaft 30 and the four-wheel drive gear 576 are coupled to each other in a relatively non-rotatable manner. The rotational driving force is transmitted from the sub transmission shaft 546 to the front wheel output shaft 30 via the front wheel input shaft 568 and the four-wheel drive gear 576. As a result, the tractor 1 transitions to a four-wheel drive state in which the rear wheels 4 as well as the front wheels 3 are driven. When the steering angle of the steering wheel 9 reaches or exceeds the predetermined angle due to the U turn operation or the like, the double speed hydraulic clutch 573 transitions to the driving force connected state, and the front wheel output shaft 30 and the double speed gear 574 are coupled to each other in a relatively non-rotatable manner. The rotational driving force is transmitted from the sub transmission shaft 546 to the front wheel output shaft 30 via the front wheel input shaft 568 and the double speed gear 574. As a result, the front wheels 3 are driven at high speed that is about two times as high as the rotation speed of the front wheels 3 corresponding to the rotational driving force from the four-wheel drive gear 576.

The front wheel transmission shaft 508, extending rearward from the front axle casing 13, and the front wheel output shaft 30, protruding forward from the lower portion of the front surface of the transmission case 17 (front lid member 491) are coupled to each other via the front wheel driving shaft 31 for transmitting the driving force to the front wheels 3. The front wheel differential gear mechanism 507 for transmitting traveling driving force to the left and right front wheels 3 is disposed in the front axle casing 13. The front wheel differential gear mechanism 507 includes: a ring gear 578 that meshes with a pinion 577 provided to the front end side of the front wheel transmission shaft 508; a differential gear case 579 provided to the ring gear 578; and a pair of differential output shafts 580 extending in the left and right direction. The differential output shaft 580 is coupled to the front axle 16 via a final gear 581 and the like. The front wheels 3 are attached to the distal end sides of the front axle 16. The front axle casing 13 has an outer side surface provided with a steering hydraulic cylinder 622 (see FIG. 20) for power steering for changing the traveling direction of the front wheels 3 between left and right in accordance with the steering operation on the steering wheel 9.

Next, a structure for switching the driving speed of the PTO shaft 25 (three stages in the normal rotation direction and a single stage in the reverse rotation direction) executed via the PTO transmission mechanism 505 is described. The PTO transmission mechanism 505 for transmitting the driving force from the engine 5 to the PTO shaft 25 is disposed in the rear chamber 496 of the transmission case 17 (rear side in the rear transmission case 113). In this configuration, a PTO input shaft 591 is coupled to the rear end side of the main transmission input shaft 28 via a PTO hydraulic clutch 590 for transmitting and blocking driving force. The PTO input shaft 591 coaxially extends with the main transmission input shaft 28. The PTO input shaft 591 is disposed in the rear chamber 496. A PTO shifting shaft 592, a PTO counter shaft 593, and the PTO shaft 25 extending in parallel with the PTO input shaft 591 are disposed in the rear chamber 496. The PTO shaft 25 extends rearward from the rear lid member 492. When the PTO clutch switch 53 is operated for transmitting driving force, the PTO hydraulic clutch 590 transitions to the driving force connected state, and the main transmission input shaft 28 and the PTO input shaft 591 are coupled to each other in a relatively non-rotatable manner. As a result, the rotational driving force is transmitted from the main transmission input shaft 28 to the PTO input shaft 591.

The PTO input shaft 591 is provided with a mid speed input gear 597, a low speed input gear 595, a high speed input gear 596, and a reversing shifter gear 598, in this order from the front side. The mid speed input gear 597, the low speed input gear 595, and the high speed input gear 596 fit on the PTO input shaft 591 in a relatively non-rotatable manner. The reversing shifter gear 598 is spline fit to the PTO input shaft 591 in such a manner as to be relatively non-rotatable and slidable in the axial direction.

A PTO mid speed gear 601 that meshes with the mid speed input gear 597, a PTO low speed gear 599 that meshes with the low speed input gear 595, and a PTO high speed gear 600 that meshes with the high speed input gear 596 are rotatably fit on the PTO shifting shaft 592. A pair of front and rear PTO transmission shifters 602 and 603 are spline fit to the PTO shifting shaft 592 in such a manner as be relatively non-rotatable and to be slidable in the axial direction. The first PTO transmission shifter 602 is disposed between the PTO mid speed gear 601 and the PTO low speed gear 599. The second PTO transmission shifter 603 is disposed further on the rear end side than the PTO high speed gear 600. The pair of front and rear PTO transmission shifters 602 and 603 slides in the axial direction in accordance with the operation on the PTO transmission lever 46. A PTO transmission gear 604 is fixed to a portion of the PTO shifting shaft 592 between the PTO low speed gear 599 and the PTO high speed gear 600.

A PTO counter gear 605, in mesh with the PTO transmission gear 604, a PTO relay gear 606, in mesh with a PTO output gear 608 fit on the PTO shaft 25 in a relatively non-rotatable manner, and a PTO reverse gear 607 are fit on the PTO counter shaft 593 in a relatively non-rotatable manner. When the reverse PTO lever 48 is operated to turn ON reverse in a state where the PTO transmission lever 46 is in a state of having been operated to be in neutral, the reversing shifter gear 598 slides to mesh with the PTO reverse gear 607 of the PTO counter shaft 593.

When the PTO transmission lever 46 is operated for shifting, the pair of front and rear PTO transmission shifters 602 and 603 slide along the PTO shifting shaft 592, in such a manner that the PTO low speed gear 595, the PTO mid speed gear 597, or the PTO high speed gear 596 is selectively coupled to the PTO shifting shaft 592. As a result, the PTO shifted output corresponding to any one of low speed, mid speed, and high speed is transmitted from the PTO shifting shaft 592 to the PTO counter shaft 593 via the PTO transmission gear 604 and the PTO counter gear 605, and is further transmitted to the PTO shaft 25 via the PTO relay gear 607 and the PTO output gear 608. The PTO transmission lever 46 and the reverse PTO lever 48 coupled to each other via the restraining mechanism (not illustrated) in an interlocking manner. Thus, the reverse PTO lever 48 cannot be operated to turn ON reverse when the PTO transmission lever 46 is operated for shifting to be in a state other than neutral.

When the reverse PTO lever 48 is operated to turn ON reverse, the reversing shifter gear 598 meshes with the PTO reverse gear 607. Thus, the rotational driving force is transmitted from the PTO input shaft 591 to the PTO counter shaft 593 via the reversing shifter gear 598 and the PTO reverse gear 607. Then, the reverse PTO shift output is transmitted from the PTO counter shaft 593 to the PTO shaft 25 via the PTO relay gear 607 and the PTO output gear 608.

A vehicle speed synchronizing output gear 610 is rotatably fit on a portion of the PTO shaft 25 further on the front side than the PTO output gear 608 and is constantly in mesh with a vehicle speed synchronizing input gear 609 fixed to the rear end portion of a parking brake shaft 594. A vehicle speed synchronizing shifter 611 is spline fit to a portion of the PTO shaft 25 between the vehicle speed synchronizing output gear 610 and the PTO output gear 608 in such a manner as to be relatively non-rotatable and slidable in the axial direction. When a PTO vehicle speed synchronizing lever (not illustrated) is operated to be ON, the vehicle speed synchronizing shifter 611 slides so that the vehicle speed synchronizing output gear 610 is coupled to the PTO shaft 25. As a result, a vehicle speed synchronized output is transmitted from the sub transmission shaft 546 to the PTO shaft 25 via the parking brake shaft 594.

The front chamber 495, the intermediate chamber 497, and the rear chamber 496 are formed in the transmission case 17. The rear wheel differential gear mechanism 506 is disposed in the rear chamber 496. The PTO transmission mechanism 505, which shifts the driving force from the engine 5 and transmits the resultant force to the PTO shaft 25, is disposed in the rear chamber 496 and further on the rear side than the rear wheel differential gear mechanism 506. The parking brake 567 is supported by the rear partitioning wall 494 that partitions between the intermediate chamber 497 and the rear chamber 496. Thus, compact arrangement of the parking brake 567 and the PTO transmission mechanism 505 on the forward and backward sides of the rear wheel differential gear mechanism 506 can be achieved. All things considered, the structure for transmitting the vehicle speed synchronized output to the PTO shaft 25 can be further simplified, and an attempt to achieve the compact transmission case 17 is facilitated.

Figure 20:
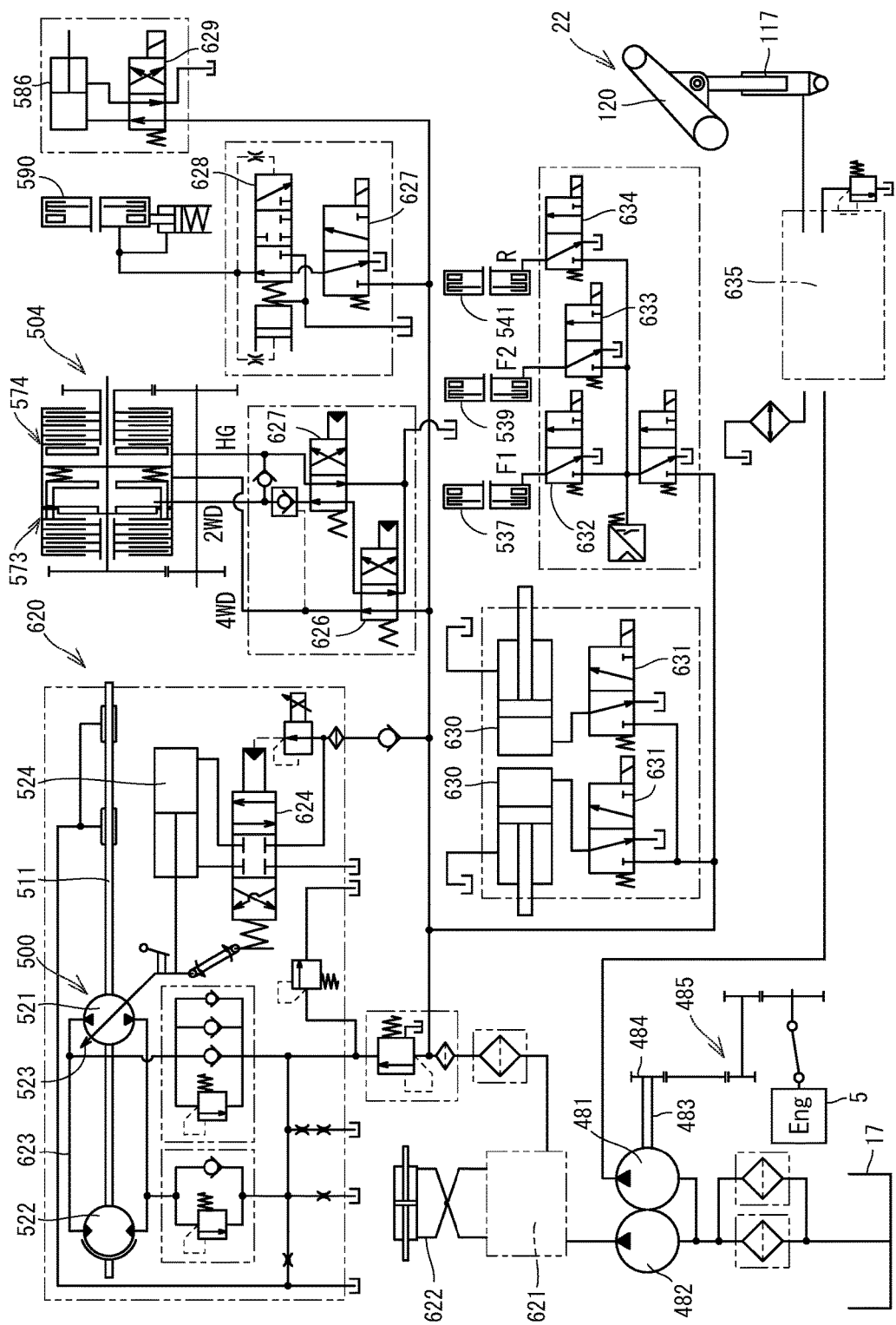
FIG. 20 is a hydraulic circuit diagram of the tractor.

Next, a structure of a hydraulic circuit 620 of the tractor 1 is described with reference to FIG. 20. The hydraulic circuit 620 of the tractor 1 includes the working machine hydraulic pump 481 and the traveling hydraulic pump 482 driven by the rotational driving force from the engine 5. In the embodiment, the transmission case 17 is used as a hydraulic oil tank, and the hydraulic oil in the transmission case 17 is supplied to the working machine hydraulic pump 481 and the traveling hydraulic pump 482. The traveling hydraulic pump 482 is coupled to the steering hydraulic cylinder 622, for power steering by the steering wheel 9, and to a closed loop oil path 623, coupling the hydraulic pump 521 and the hydraulic motor 522 of the hydraulic continuously variable transmission 500 to each other, via a control valve mechanism 621 for power steering. While the engine 5 is driving, the hydraulic oil is constantly supplied from the traveling hydraulic pump 482 to the closed loop oil path 623.

The traveling hydraulic pump 482 is coupled to: a main transmission hydraulic switching valve 624 for the main transmission hydraulic cylinder 524 of the hydraulic continuously variable transmission 500; a double speed hydraulic switching valve 625 for the double speed hydraulic clutch 573; a four-wheel drive hydraulic switching valve 626 for the four-wheel drive hydraulic clutch 575; a PTO clutch solenoid valve 627 for the PTO hydraulic clutch 590; a switching valve 628 operated by the PTO clutch solenoid valve 627; and a diff-lock solenoid valve 629 for a diff-lock cylinder 586 for operating the diff-lock mechanism.

Furthermore, the traveling hydraulic pump 482 is coupled to: left and right auto brake solenoid valves 631 as switching valves each operating a corresponding one of a pair of left and right brake cylinders 630 for auto braking; a forward traveling low speed clutch solenoid valve 632 for operating the forward traveling low speed hydraulic clutch 537; a forward traveling high speed clutch solenoid valve 633 for operating the forward traveling high speed hydraulic clutch 539; and a backward traveling clutch solenoid valve 634 for operating the backward traveling hydraulic clutch 541. The working machine hydraulic pump 481 is coupled to a control valve mechanism 635 for supplying the hydraulic oil to the left and right hydraulic lift cylinders 117 of the hydraulic lifting and lowering mechanism 22. The hydraulic circuit 620 includes a relief valve, a flowrate adjustment valve, a check valve, an oil cooler, an oil filter, and the like.

Figure 21:
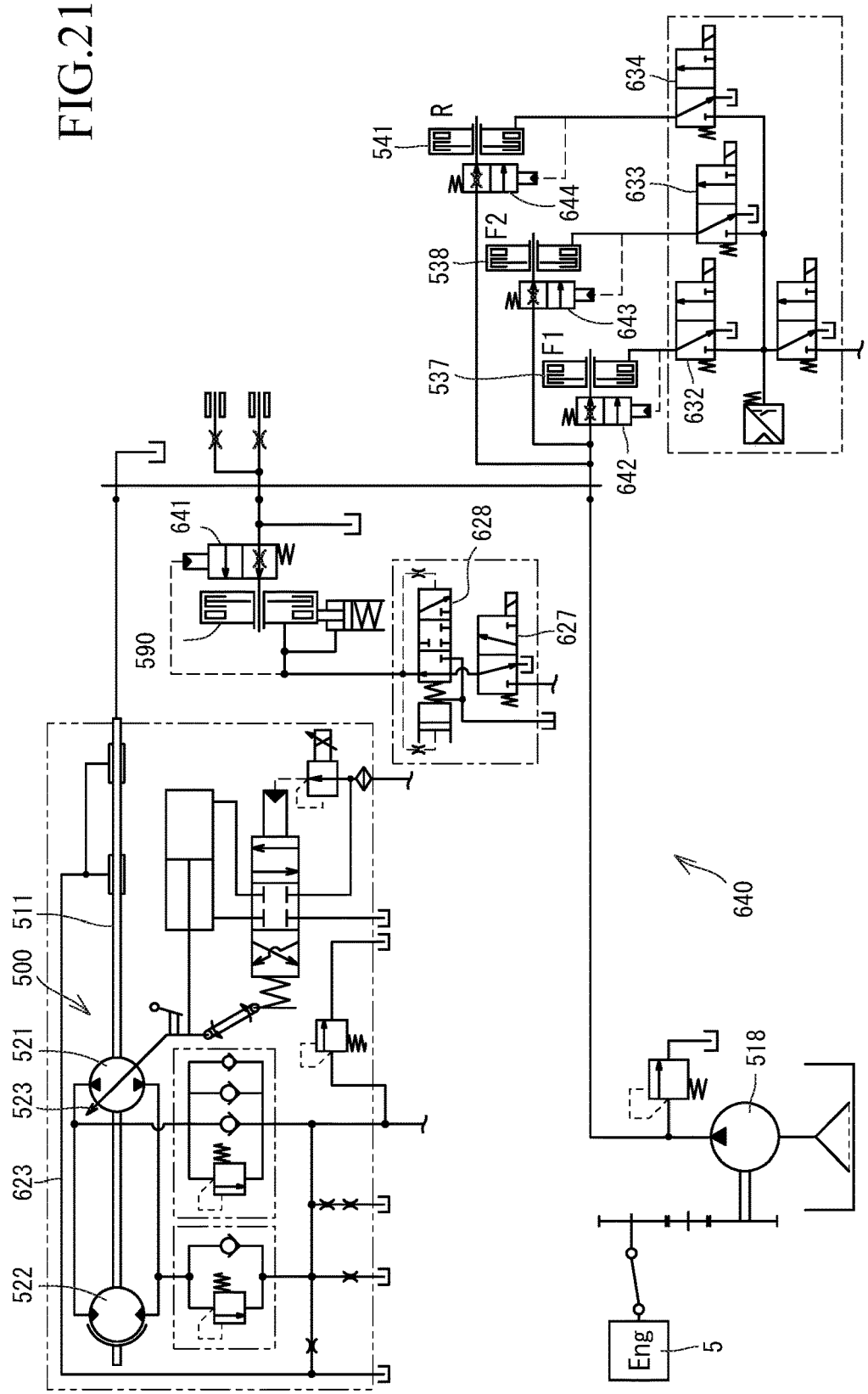
FIG. 21 is a hydraulic circuit diagram of a lubrication system of the tractor.

Next, a structure of a hydraulic circuit 640 as a lubrication system in the tractor 1 is described with reference to FIG. 21. The hydraulic circuit 640 as a lubrication system in the tractor 1 includes the lubricant oil pump 518 driven by the rotational driving force from the engine 5. The lubricant oil pump 518 is coupled to: a PTO clutch hydraulic switching valve 641 for supplying the hydraulic oil (lubricant oil) to a lubrication portion of the PTO hydraulic clutch 590; a forward traveling low speed clutch hydraulic switching valve 642 for supplying the hydraulic oil (lubricant oil) to a lubrication portion of the input transmission shaft 511 supporting the hydraulic continuously variable transmission 500, and to a lubrication portion of the forward traveling low speed hydraulic clutch 537; a forward traveling high speed clutch hydraulic switching valve 643 for supplying the hydraulic oil (lubricant oil) to a lubrication portion of the forward traveling high speed hydraulic clutch 539; and a backward traveling clutch hydraulic switching valve 644 for supplying the hydraulic oil (lubricant oil) to a lubrication portion of the backward traveling hydraulic clutch 541.

In the configuration described above, the lubricant oil pump 518 driven by the driving force from the engine 5 is disposed in the transmission case 17. The lubricant oil pump 518 supplies the hydraulic oil in the transmission case 17 to the internal mechanisms 500, 501, and 590 of the transmission case 17 for lubrication. Thus, the hydraulic oil can be supplied as the lubricant oil to the internal mechanisms 500, 501, and 590 of the transmission case 17 by the dedicated lubricant oil pump 518, whereby the internal mechanisms 500, 501, and 590 can be certainly lubricated. Thus, the lubricant oil can be stably supplied to the internal mechanisms 500, 501, and 590, and the proper function of the internal mechanisms 500, 501, and 590 can be guaranteed.

Specifically, the front chamber 495, the intermediate chamber 497, and the rear chamber 496 are formed in the transmission case 17. The hydraulic continuously variable transmission 500 is disposed in the front chamber 495. The forward/backward traveling switching mechanism 501 is disposed in the intermediate chamber 497. The PTO hydraulic clutch 590 is disposed in the rear chamber 496. The lubricant oil pump 518 is supported by the intermediate supporting plate 498 attached to the front surface of the rear partitioning wall 494 partitioning between the intermediate chamber 497 and the rear chamber 496. Thus, the lubricant oil pump 518 can be disposed at the closest possible position relative to the members 500, 501, and 590 as members in the internal mechanisms consuming a large amount of lubricant oil. Thus, the lubricant oil can be actively supplied to the members 500, 501, and 590, and the lubrication hydraulic system can be simplified.

As is apparent from the description above and FIG. 11 to FIG. 19, the working vehicle 1 includes: the engine 5 mounted on the traveling machine body 2; the hydraulic continuously variable transmission 500 configured to shift driving force from the engine 5; the transmission case 17 incorporating the hydraulic continuously variable transmission 500; and the rear traveling units 4 disposed on both left and right sides of the transmission case 17 via the rear axle cases 19. The transmission case 17 is divided into three sections of the front case 112, the intermediate case 114, and the rear case 113. Thus, the three sections, that is, the front case 112, the intermediate case 114, and the rear case 113 can be assembled with parts such as a shaft and gears provided in the cases 112 to 114 in advance. Thus, the transmission case 17 can be accurately and efficiently assembled.

The left and the right rear axle cases 19 are attached to both left and right sides of the rear case 113. The intermediate case 114 coupling the front case 112 and the rear case 113 to each other is coupled to the left and right vehicle body frames 15 forming the traveling machine body 2. Thus, for example, only the front case 112 can be detached, for performing operations such as replacement of the shaft and the gear, with the intermediate case 114 and the rear case 113 remaining attached to the vehicle body frames 15. Thus, the transmission case 17 as a whole is much less frequently removed (detached) from the working vehicle 1, whereby the maintenance and repairing can be performed with much higher operability.

In the embodiment, the intermediate case 114 and the rear case 113 are made of cast iron, and the front case 112 is made of die-cast aluminum. Thus, the intermediate case 114 coupled to the vehicle body frames 15 and the rear case 113 to which the left and right rear axle cases 19 are coupled can be formed as highly rigid members forming the traveling machine body 2. The front case 112 is not a rigid member but can have a light weight. All things considered, the transmission case 17 as a whole can be made to have a light weight, with the traveling machine body 2 being sufficiently rigid.

The input shaft 28, receiving the driving force from the engine 5, and the input transmission shaft 511, receiving the driving force from the input shaft 28, are arranged in parallel with each other and extend from the front case 112 to the intermediate case 114. The hydraulic continuously variable transmission 500 is disposed in the front transmission case 112 via the input transmission shaft 511. Thus, for example, the hydraulic continuously variable transmission 500 can be exposed by detaching only the front case 112 with the intermediate case 114 and the rear case 113 remaining attached to the vehicle body frames 15. Thus, a higher maintainability can be achieved for the hydraulic continuously variable transmission 500 disposed in the transmission case 17.

As is apparent from the description above and in FIG. 11 to FIG. 19, the working vehicle 1 includes: the engine 5 mounted on the traveling machine body 2; the hydraulic continuously variable transmission 500 configured to shift driving force from the engine 5; the transmission case 17 incorporating the hydraulic continuously variable transmission 500; and the rear traveling units 4 disposed on both left and right sides of the transmission case 17 via the rear axle cases 19. The transmission case 17 is divided into three sections of the front case 112, the intermediate case 114, and the rear case 113. The input shaft 28 receiving the driving force from the engine 5 and the input transmission shaft 511 receiving the driving force from the input shaft 28 extend from the front case 112 to the intermediate case 114 while being arranged in parallel with each other. In the front case 112, the hydraulic continuously variable transmission 500 is disposed via the input transmission shaft 511. In the intermediate case 114, the forward/backward traveling switching mechanism 501 is disposed that switches the output from the hydraulic continuously variable transmission 500 between the normal and reverse rotation directions. Thus, the traveling power transmission system can be collectively accommodated in the front case 112 and the intermediate case 114 (front portion of the transmission case 17), whereby a higher assemblability and maintainability can be achieved for the traveling power transmission system and the transmission case 17.

The intermediate case 114 and the rear case 113 are made of cast iron, and the front case 112 is made of die-cast aluminum. The traveling transmission gear mechanisms 502, 503, for multistage shifting of the output from the forward/backward traveling switching mechanism 501, are further provided in the front case 112. Thus, the forward/backward traveling switching mechanism 501 is provided on a side of the intermediate case 114 which is heavy, whereas the hydraulic continuously variable transmission 500 and the traveling transmission gear mechanisms 502, 503 are provided on the side of the front case 112, which is light. Thus, the transmission case 17 can have an excellent weight balance.

As is apparent from the description above and in FIG. 11 to FIG. 19, the working vehicle 1 includes: the engine 5 mounted on the traveling machine body 2; the hydraulic continuously variable transmission 500 configured to shift driving force from the engine 5; the transmission case 17 incorporating the hydraulic continuously variable transmission 500; and the rear traveling units 4 disposed on both left and right sides of the transmission case 17 via the rear axle cases 19. The transmission case 17 is divided into three sections of the front case 112, the intermediate case 114, and the rear case 113. The input shaft 28, receiving the driving force from the engine 5, and the input transmission shaft 511, receiving the driving force from the input shaft 28, are arranged in parallel with each other and extend from the front case 112 to the intermediate case 114. In the front case 112, the hydraulic continuously variable transmission 500 is disposed via the input transmission shaft 511. The hydraulic continuously variable transmission 500 is attached on the inner surface side of the front lid member 491 that is detachably attached to close the opening of the front surface of the front case 112. Thus, the hydraulic continuously variable transmission 500 can be exposed when the front lid member 491 is detached from the transmission case 17. Thus, a higher maintainability can be achieved for the hydraulic continuously variable transmission 500 disposed in the transmission case 17.

The traveling transmission gear mechanisms 502, 503, for multistage shifting of the output from the forward/backward traveling switching mechanism 501, are further provided in the front case 112. The hydraulic continuously variable transmission 500 is disposed in the front case 112 to be positioned higher than the traveling transmission gear mechanisms 502, 503. Thus, the traveling transmission gear mechanisms 502, 503 with smaller resistance to stirring of the hydraulic oil in the transmission case 17 compared with the hydraulic continuously variable transmission 500, are at a low position. Thus, a risk of stirring the hydraulic oil in the transmission case 17 in the hydraulic continuously variable transmission 500 can be reduced (the resistance to stirring the hydraulic oil due to the hydraulic continuously variable transmission 500 can be reduced). This contributes to an improvement of the transmission efficiency of the hydraulic continuously variable transmission 500.

As is apparent from the description above and in FIG. 11, FIGS. 17 to 19, and FIG. 21, the working vehicle 1 includes: the engine 5 mounted on the traveling machine body 2; and the transmission case 17 configured to shift the driving force from the engine 5 and transmit the resultant force to the traveling units 3, 4 configured to support the traveling machine body 2. The lubricant oil pump 518 driven by the driving force from the engine 5 is disposed in the transmission case 17. The lubricant oil pump 518 supplies the hydraulic oil in the transmission case 17 to the internal mechanisms 500, 501, and 590 of the transmission case 17 for lubrication. Thus, the hydraulic oil can be supplied as the lubricant oil to the internal mechanisms 500, 501, and 590 of the transmission case 17 by the dedicated lubricant oil pump 518, whereby the internal mechanisms 500, 501, and 590 can be certainly lubricated. Thus, the lubricant oil can be stably supplied to the internal mechanisms 500, 501, and 590, and the proper function of the internal mechanisms 500, 501, and 590 can be guaranteed.

The front chamber 495, the intermediate chamber 497, and the rear chamber 496 are formed in the transmission case 17. The hydraulic continuously variable transmission 500 is disposed in the front chamber 495. The forward/backward traveling switching mechanism 501 is disposed in the intermediate chamber 497. The PTO hydraulic clutch 590 is disposed in the rear chamber 496. The lubricant oil pump 518 is supported by the intermediate supporting plate 498 attached to the front surface of the rear partitioning wall 494 partitioning between the intermediate chamber 497 and the rear chamber 496. Thus, the lubricant oil pump 518 can be disposed at the closest possible position relative to the members 500, 501, and 590 as members in the internal mechanisms consuming a large amount of lubricant oil. Thus, the lubricant oil can be actively supplied to the members 500, 501, and 590, and the lubrication hydraulic system can be simplified.

Figure 11:
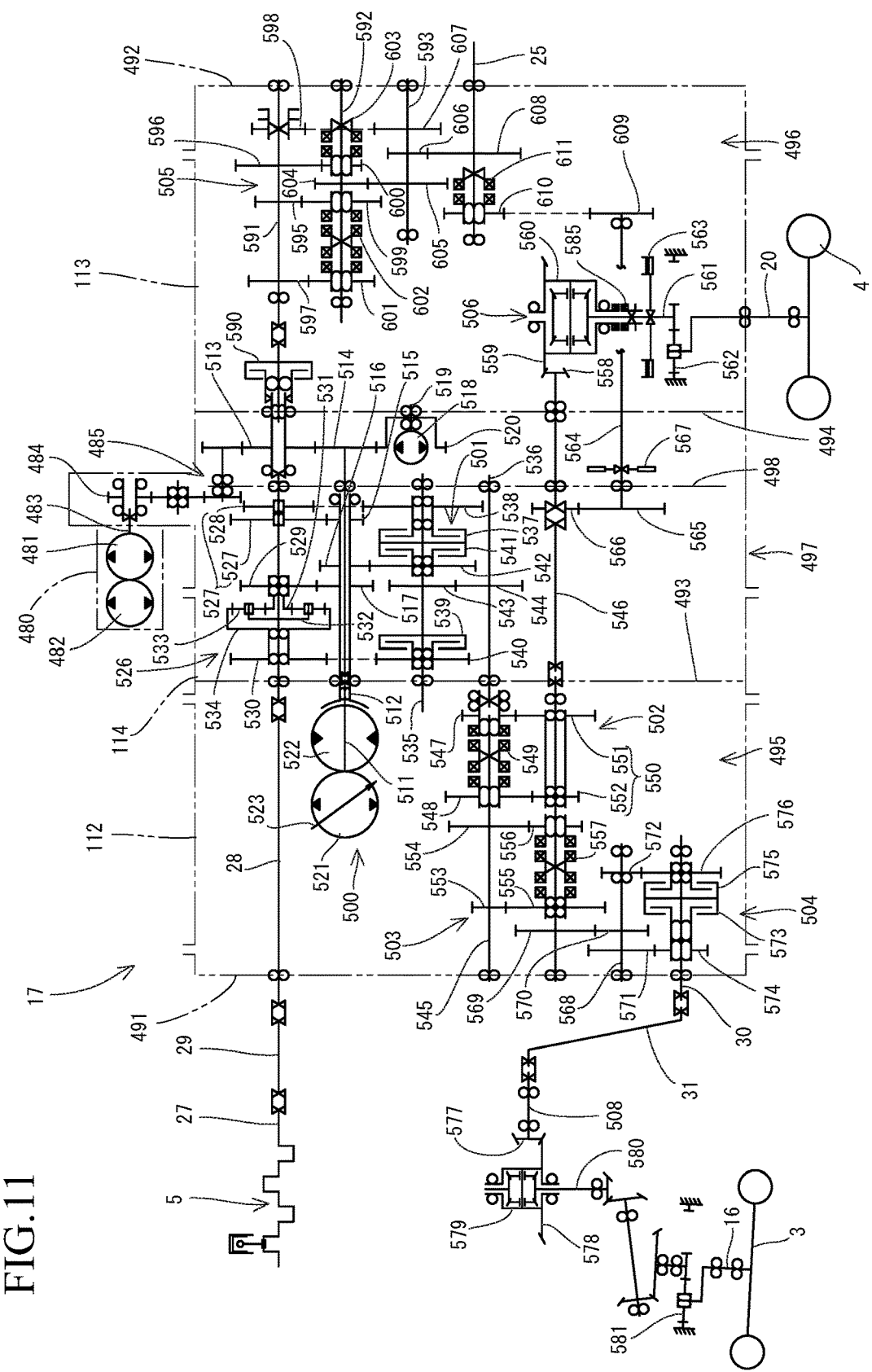
FIG. 11 is a skeleton diagram illustrating a driving force transmission system of the tractor.
Figure 12:
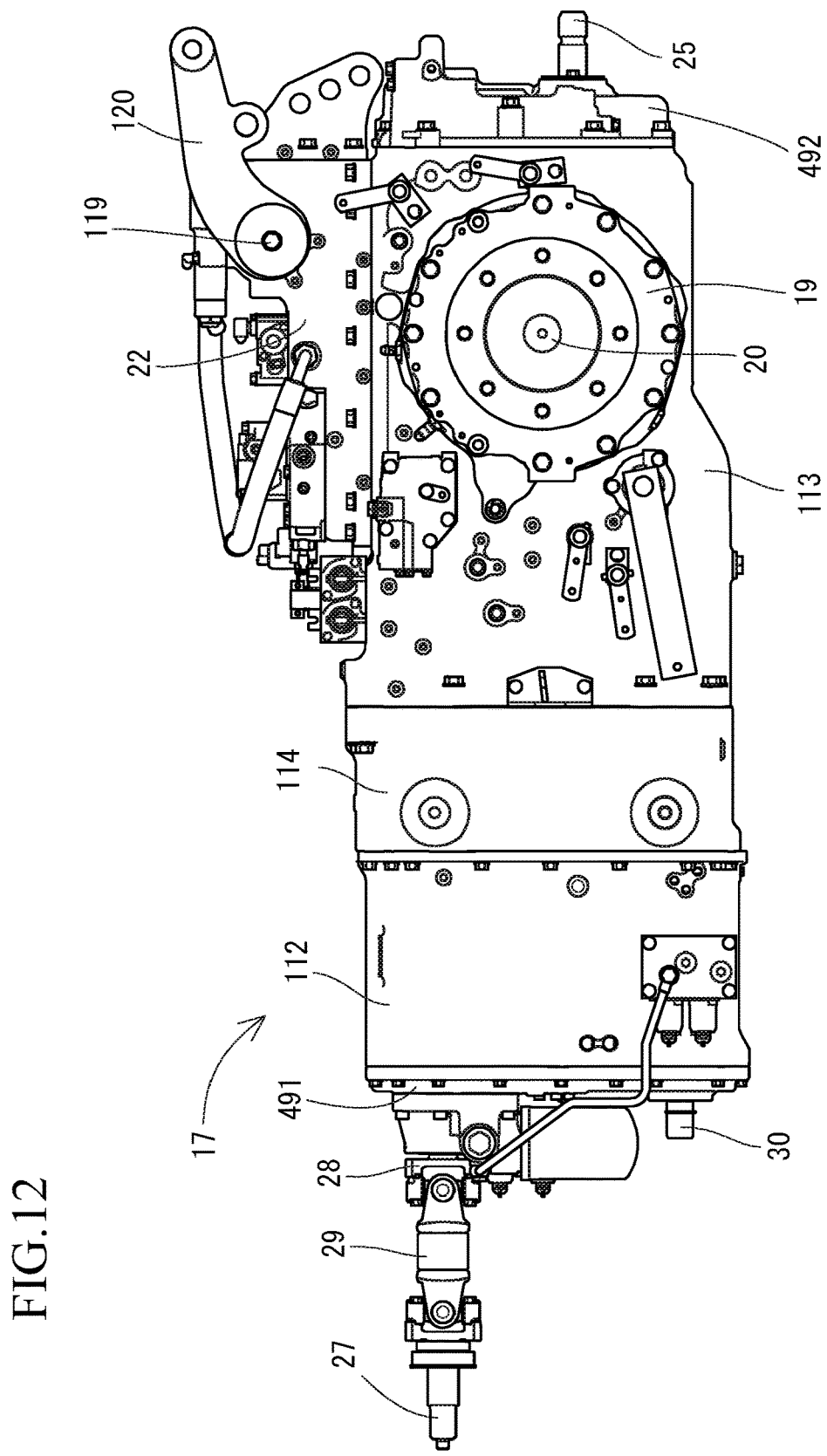
FIG. 12 is a left side view of a transmission case.
Figure 13:
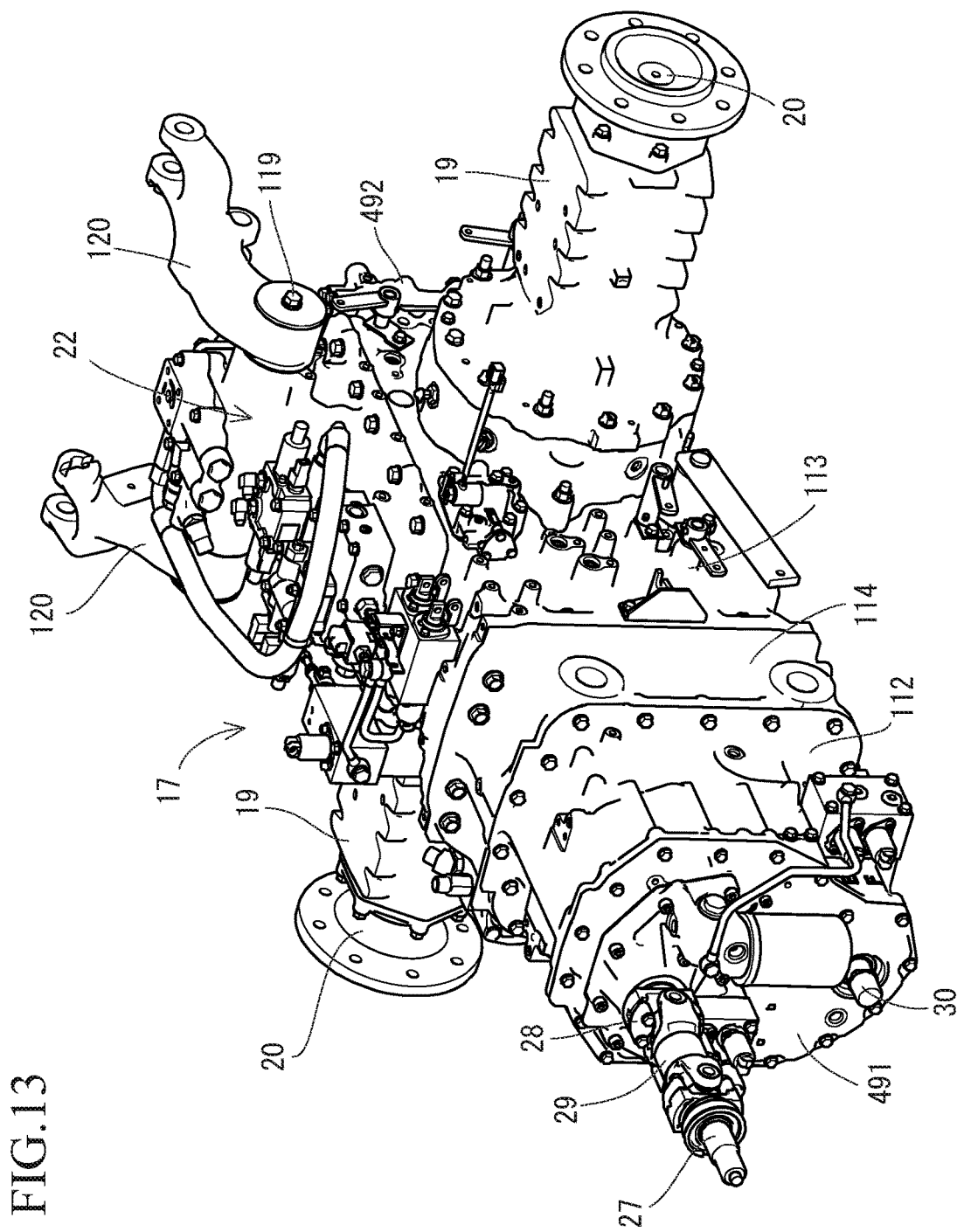
FIG. 13 is a perspective view of the transmission case as diagonally viewed from a front left side.
Figure 14:
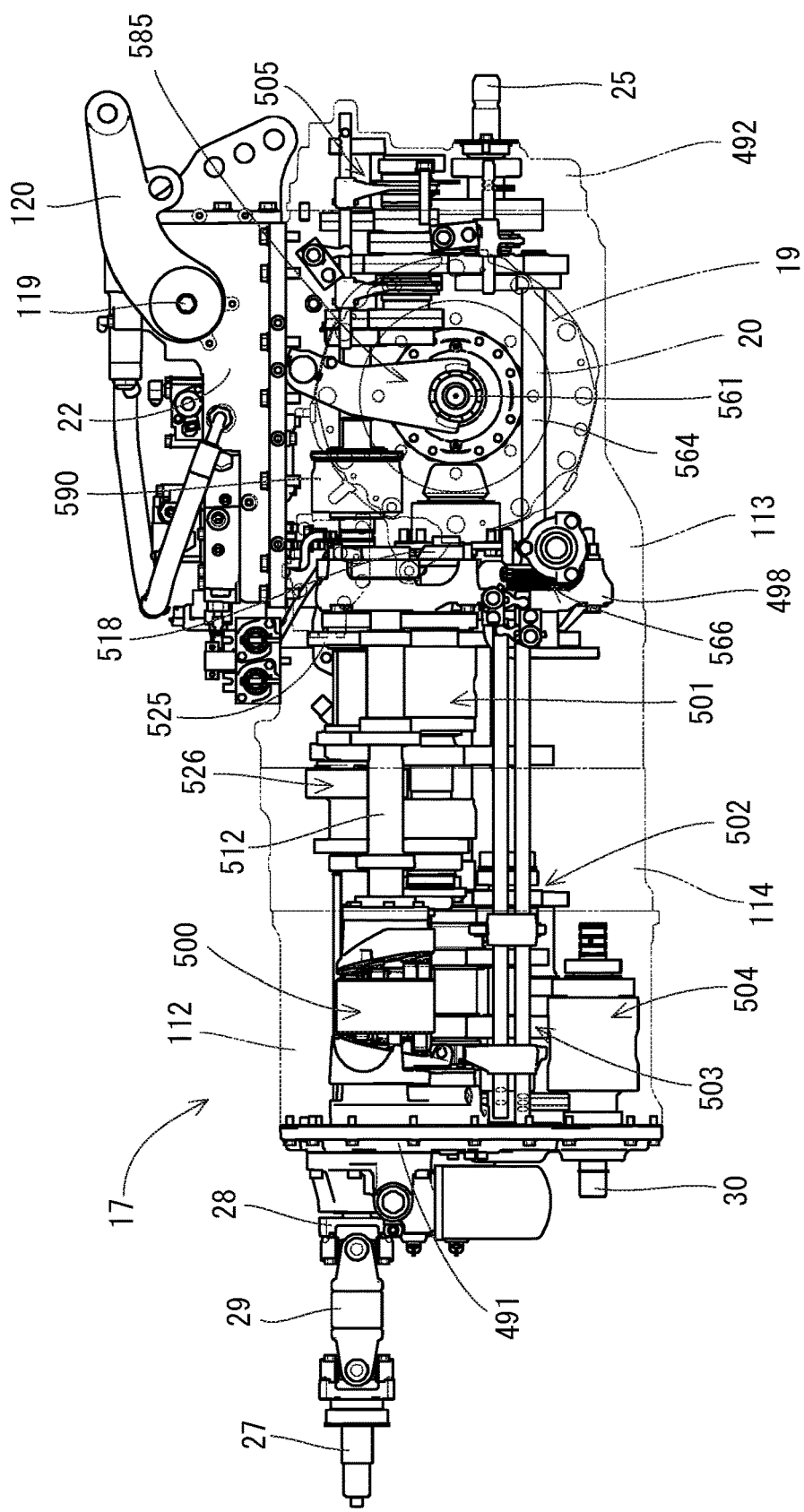
FIG. 14 is a left side view illustrating an internal structure of the transmission case.
Figure 15:
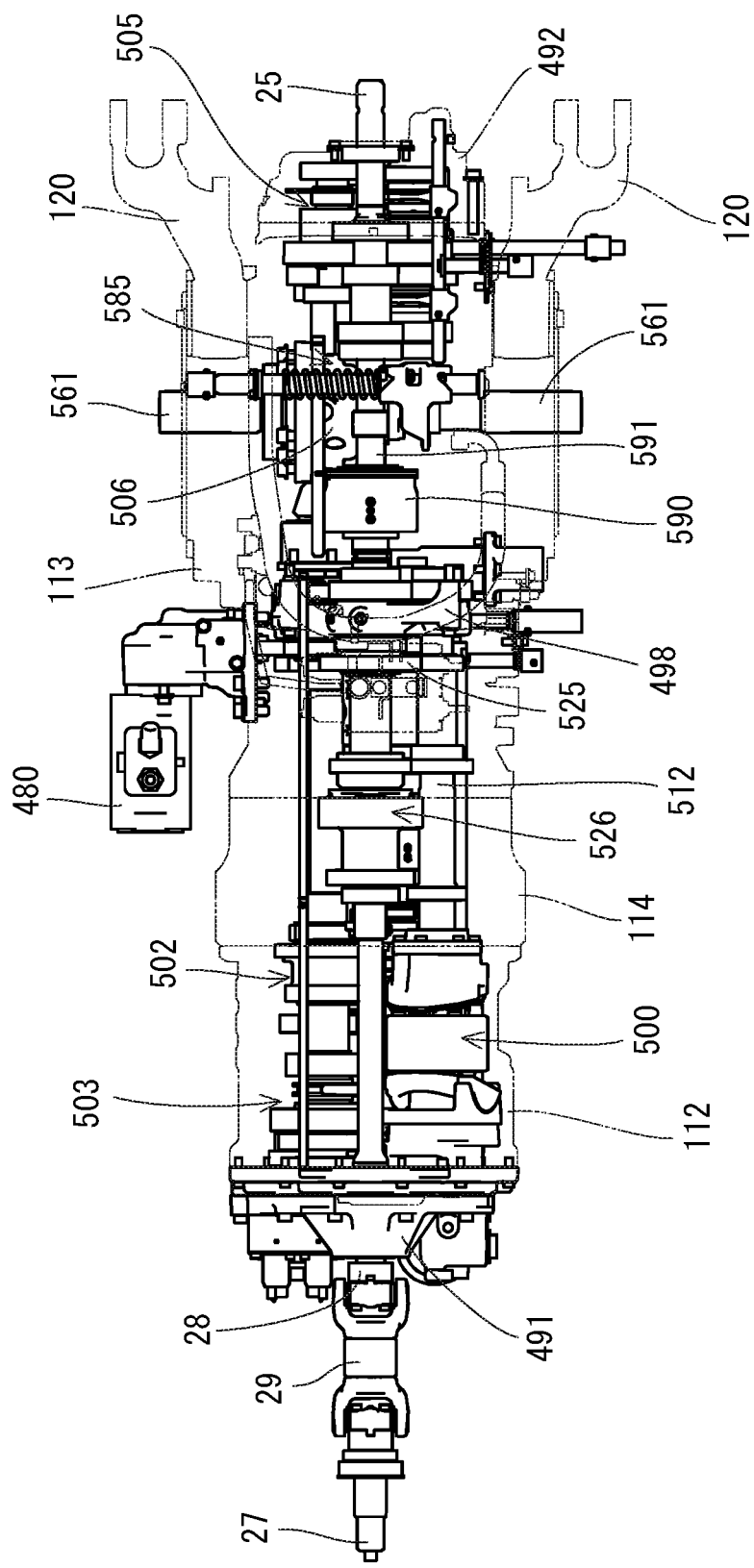
FIG. 15 is a plan view illustrating the internal structure of the transmission case.
Figure 16:
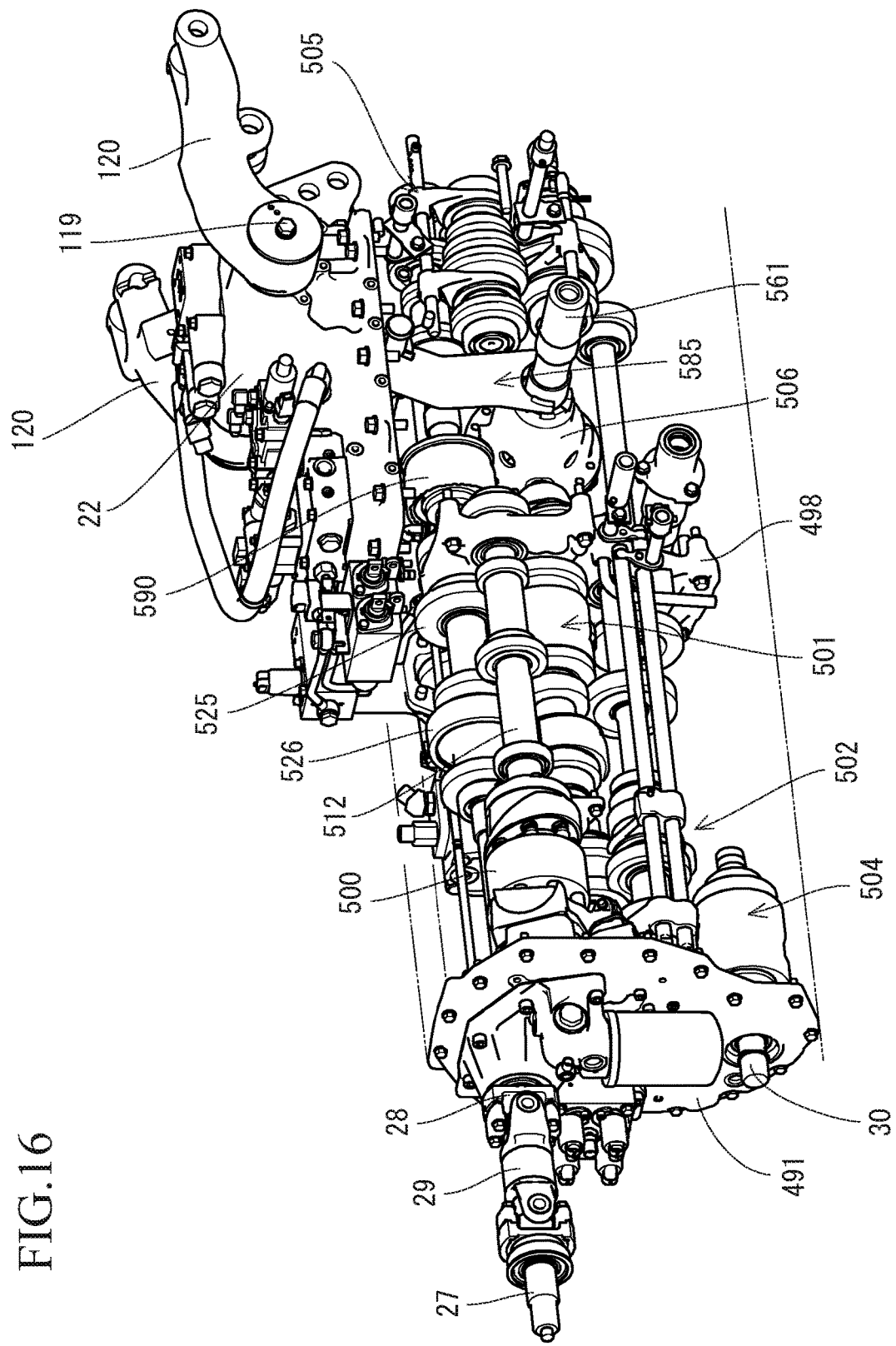
FIG. 16 is a perspective view illustrating the internal structure of the transmission case.
Figure 17:
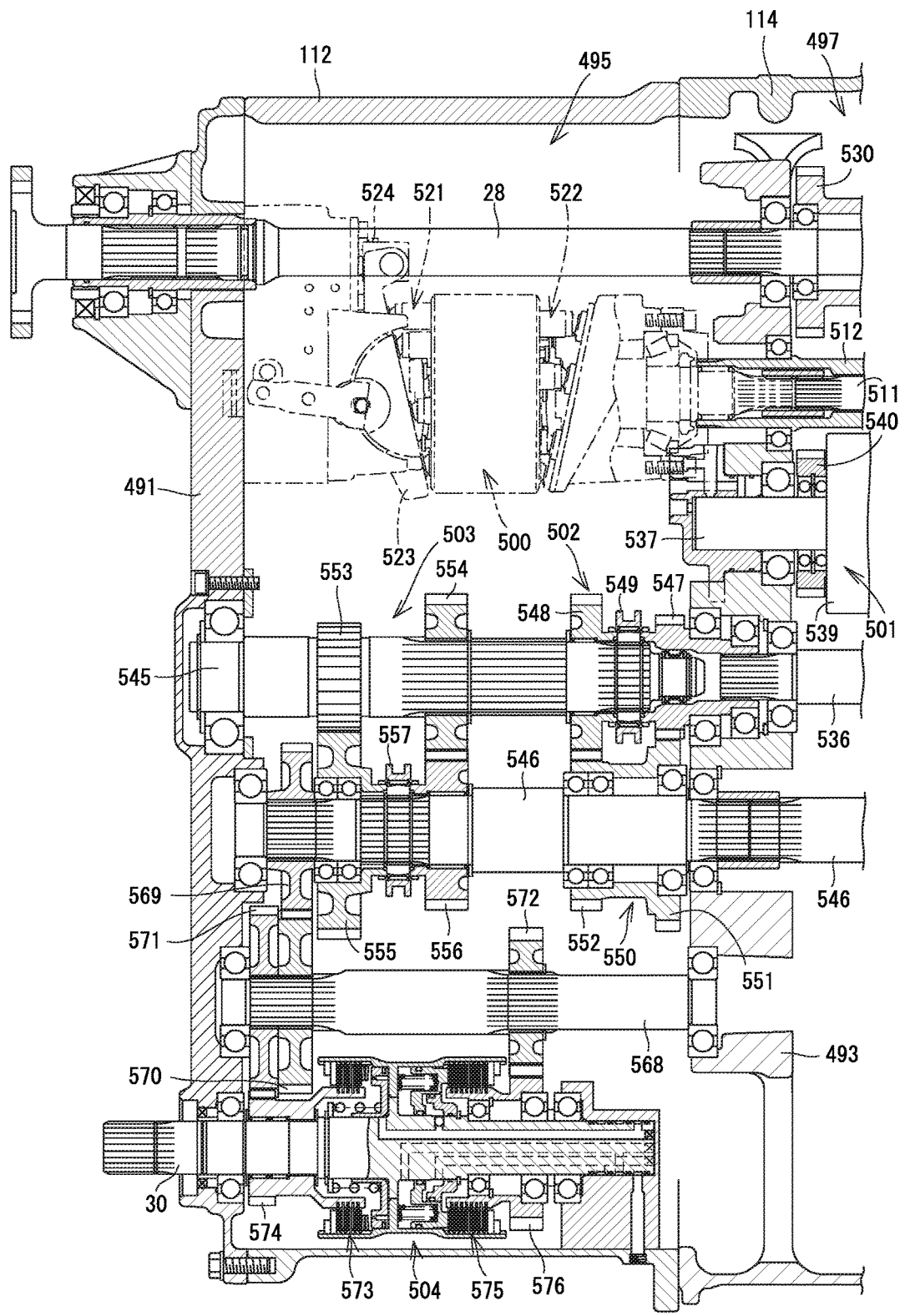
FIG. 17 is a left cross-sectional view illustrating the front portion of the transmission case.
Figure 18:
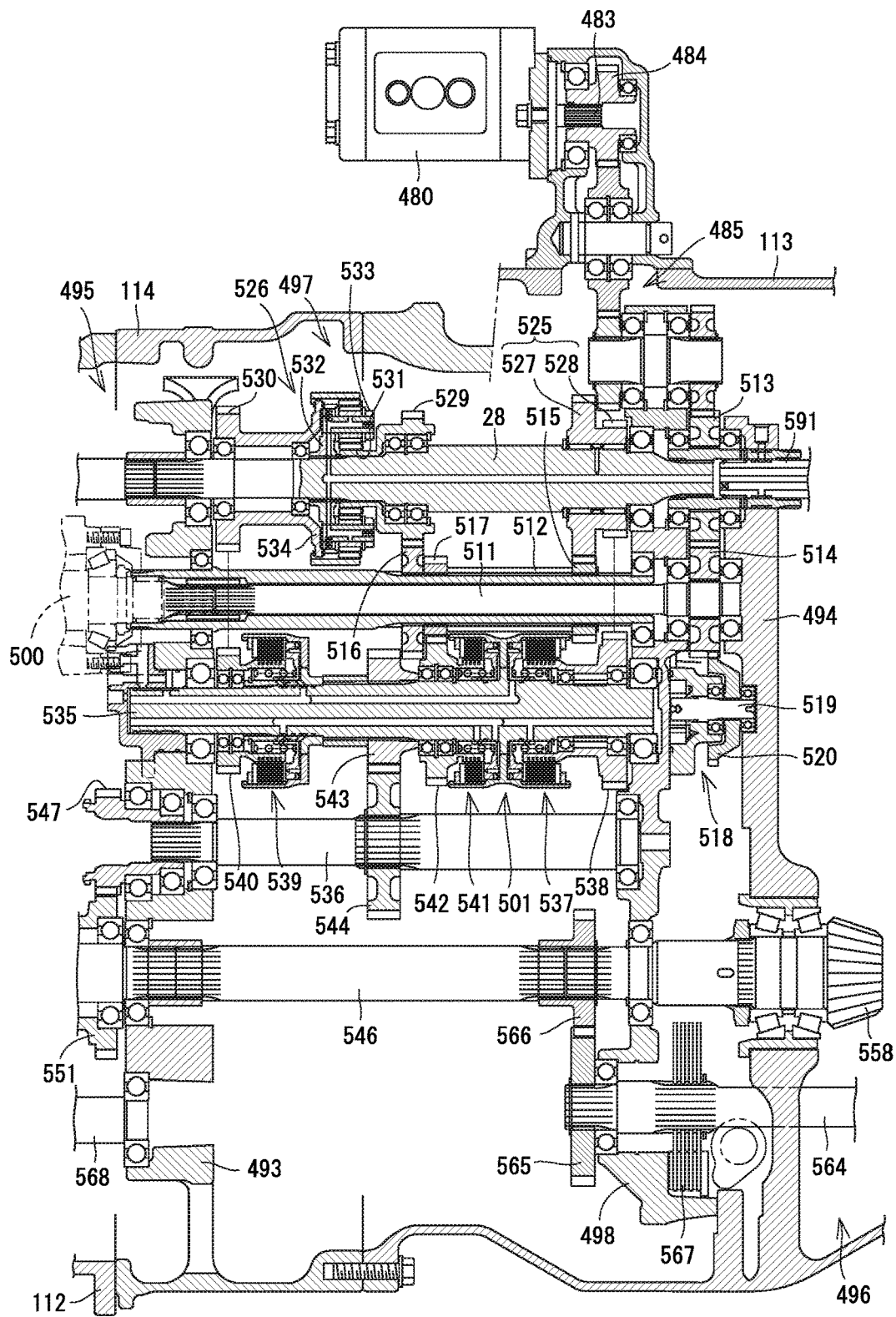
FIG. 18 is a left cross-sectional view illustrating an intermediate portion of the transmission case.
Figure 19:
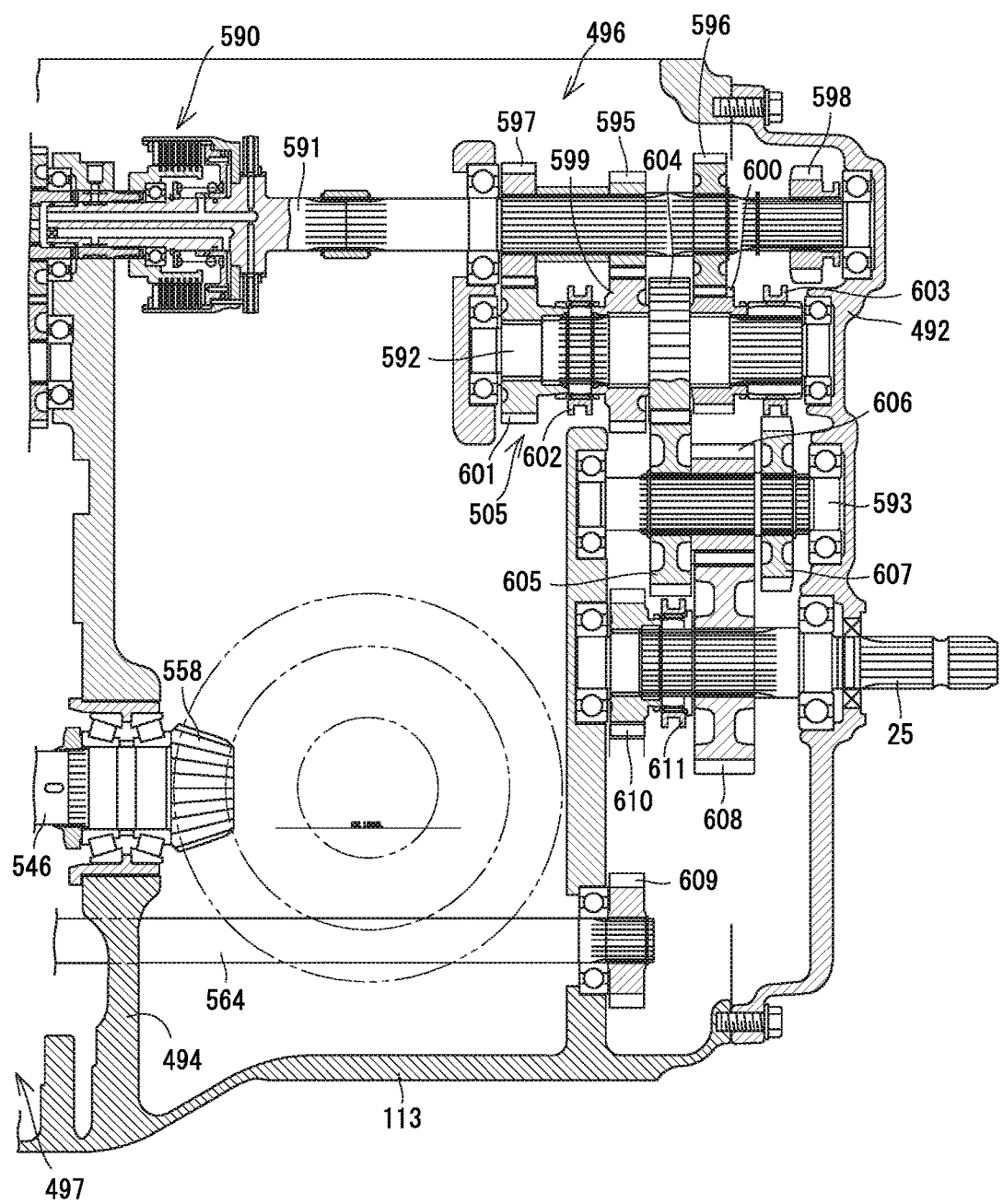
FIG. 19 is a left cross-sectional view of a rear portion of the transmission case.

As is apparent from the description above and in FIGS. 11, 18, and 19, the working vehicle 1 includes: the engine 5 mounted on the traveling machine body 2; the transmission case 17 configured to shift the driving force from the engine 5; and the rear traveling units 4 provided on both left and right sides of the transmission case 17 via the rear axle cases 19. The transmission case 17 incorporates the differential mechanism 506 that transmits the shifted driving force from the transmission case 17 to the left and right rear traveling units 4. The parking brake 567 is disposed in the transmission case 17, separately from the left and right brake mechanisms 563 for putting a brake on the rear traveling units 4. The parking brake 567 maintains the braking state of the differential mechanism 506. Thus, the braking for the traveling and the braking for the parking can be separately executed by different brakes (the brake mechanism 563 and the parking brake 567). Thus, durability of both the brake mechanism 563 and the parking brake 567 can be improved.

The front chamber 495, the intermediate chamber 497, and the rear chamber 496 are formed in the transmission case 17. The parking brake 567 is disposed on the side of the intermediate chamber 497. The rear wheel differential mechanism 506 is positioned on the side of the rear chamber 496. The intermediate supporting plate 498 is detachably fastened to the front surface side of the rear partitioning wall 494 partitioning between intermediate chamber 497 and the rear chamber 496. The intermediate supporting plate 498 supports the parking brake 567. Thus, the parking brake 567 can apply braking to the differential mechanism 506 on the upstream side of the brake mechanism 563, whereby the braking state of the traveling machine body 1 can be certainly maintained. The parking brake 567 is entirely attached to the intermediate supporting plate 498. Thus, the intermediate supporting plate 498 can be attached to the rear partitioning wall 494 together with the parking brake 567. Thus, the assemblability of the transmission case 17 can be improved, and the parking brake 567 can be stably and accurately attached.

As is apparent from the description above and in FIGS. 11, 18, and 19, the working vehicle 1 includes: the engine 5 mounted on the traveling machine body 2; the transmission case 17 configured to shift the driving force from the engine 5; and the rear traveling units 4 provided on both left and right sides of the transmission case 17 via the rear axle cases 19. The transmission case 17 incorporates the differential mechanism 506 that transmits the shifted driving force from the transmission case 17 to the left and right rear traveling units 4. The parking brake 567 is disposed in the transmission case 17, separately from the left and right brake mechanisms 563 for putting a brake on the rear traveling units 4. The parking brake 567 maintains the braking state of the differential mechanism 506. The vehicle speed synchronized output is transmitted, from the driving force transmission system for the parking brake 567, to the PTO shaft 25 protruding rearward from the transmission case 17. Thus, the braking for the traveling and the braking for the parking can be separately executed by different brakes (the brake mechanism 563 and the parking brake 567). Thus, durability of both the brake mechanism 563 and the parking brake 567 can be improved. Furthermore, the vehicle speed synchronized output can be transmitted to the PTO shaft 25 with a simple structure by using the driving force transmission system for the parking brake 567. Thus, the number of parts and thus the cost can be reduced.

The front chamber 495, the intermediate chamber 497, and the rear chamber 496 are formed in the transmission case 17. The differential mechanism 506 is disposed in the rear chamber 496. The PTO transmission mechanism 505, which shifts the driving force from the engine 5 and transmits the resultant force to the PTO shaft 25, is disposed in the rear chamber 496 and further on the rear side than the differential mechanism 506. The parking brake 567 is supported by the rear partitioning wall 494 that partitions between the intermediate chamber 497 and the rear chamber 496. Thus, compact arrangement of the parking brake 567 and the PTO transmission mechanism 505 on the forward and backward sides of the differential mechanism 506 can be achieved. All things considered, the structure for transmitting the vehicle speed synchronized output to the PTO shaft 25 can be further simplified, and an attempt to achieve the compact transmission case 17 is facilitated.

The configuration of portions in the invention according to the present application is not limited to that in the illustrated embodiment, and can be modified in various ways without departing from the gist of the invention according to the present application.

The embodiments of the present invention relates to a working vehicle including a working vehicle for farming such as a tractor and a special working vehicle such as a crane truck, for example.

What is claimed is:

1. A working vehicle comprising:
   an engine mounted on a traveling machine body;
   a hydraulic continuously variable transmission configured to shift driving force from the engine;
   a transmission case incorporating the hydraulic continuously variable transmission; and
   rear traveling units disposed on both left and right sides of the transmission case via rear axle cases,
   wherein the transmission case is divided into three sections of a front case, an intermediate case, and a rear case,
   wherein the rear axle cases on the left and right sides are attached to both left and right sides of the rear case,
   wherein the intermediate case, coupling the front case to the rear case, is coupled to left and right vehicle body frames forming the traveling machine body, and
   wherein end portions of the left and right vehicle body frames are coupled to both left and right side faces of the intermediate case by an upper vehicle body coupling shaft member and a lower vehicle body coupling shaft member.

2. The working vehicle according to claim 1, wherein the intermediate case and the rear case are made of cast iron and the front case is made of die-cast aluminum.

3. The working vehicle according to claim 1,
   wherein an input shaft that receives driving force from the engine and an input transmission shaft that receives driving force from the input shaft extend from the front case to the intermediate case, while being in parallel with each other, and
   wherein the hydraulic continuously variable transmission is disposed in the front case via the input transmission shaft.

4. The working vehicle according to claim 3, wherein a forward/backward traveling switching mechanism configured to switch an output from the hydraulic continuously variable transmission between normal and reverse rotation directions is disposed in the intermediate case.

5. The working vehicle according to claim 3, wherein the hydraulic continuously variable transmission is attached on an inner surface side of a front lid member that is detachably attached to close an opening on a front surface of the front case.

6. The working vehicle according to claim 5,
   wherein a traveling transmission gear mechanism configured to achieve multistage transmission of an output from the forward/backward traveling switching mechanism is further disposed in the front case, and wherein the hydraulic continuously variable transmission is disposed at a higher position than the traveling transmission gear mechanism in the front case.

7. The working vehicle according to claim 1,
wherein a lubricant oil pump driven by the driving force from the engine is disposed in the transmission case, and
wherein hydraulic oil in the transmission case is supplied by the lubricant oil pump to an internal mechanism in the transmission case for lubrication.

8. The working vehicle according to claim 7,
wherein a front chamber, an intermediate chamber, and a rear chamber are formed in the transmission case, and
wherein the lubricant oil pump is supported by an intermediate supporting plate attached to a front surface side of a rear partitioning wall partitioning between the intermediate chamber and the rear chamber.

9. The working vehicle according to claim 1,
wherein a differential mechanism configured to transmit shifted driving force from the transmission case to the left and right rear traveling units is disposed in the transmission case, and
wherein a parking brake configured to maintain a braking state of the differential mechanism is disposed in the transmission case, separately from left and right brake mechanisms configured to put a brake on the rear traveling units.

10. The working vehicle according to claim 9,
wherein a front chamber, an intermediate chamber, and a rear chamber are formed in the transmission case,
wherein the parking brake is positioned on the intermediate chamber side,
wherein the differential mechanism is positioned on the rear chamber side,
wherein an intermediate supporting plate is detachably fastened to a front surface side of a rear partitioning wall partitioning between the intermediate chamber and the rear chamber, and
wherein the parking brake is supported by the intermediate supporting plate.

11. The working vehicle according to claim 9, wherein a vehicle speed synchronized output is transmitted from a driving force transmission system for the parking brake to a PTO shaft extending rearward from the transmission case.

* * * * *